US005995831A

United States Patent [19]

Gulliford et al.

[11] Patent Number: 5,995,831
[45] Date of Patent: Nov. 30, 1999

[54] CELLULAR-TELEPHONE CENTRAL CALL-PROCESSING SYSTEM UTILIZING OBJECT-ORIENTED SOFTWARE IN ADJUNCT PERSONAL COMPUTER

[75] Inventors: Philip Case Gulliford, Longwood; Christopher Craig Matthies, Casselberry; John Carter, Gainesville; Charles Tsao, Mary, all of Fla.

[73] Assignee: Phoenix Wireless Group, Maitland, Fla.

[21] Appl. No.: 08/680,467

[22] Filed: Jul. 15, 1996

[51] Int. Cl.$^6$ .................................................. H04B 7/00
[52] U.S. Cl. .......................... 455/426; 455/406; 455/461; 455/560
[58] Field of Search .................................. 455/403, 406, 455/422, 426, 456, 457, 461, 560

[56] References Cited

U.S. PATENT DOCUMENTS

| | | | |
|---|---|---|---|
| 5,109,401 | 4/1992 | Hattori et al. | 379/58 |
| 5,195,090 | 3/1993 | Bolliger et al. | 455/560 |
| 5,353,331 | 10/1994 | Emery et al. | 455/461 |
| 5,517,555 | 5/1996 | Amadaon et al. | 379/59 |
| 5,566,227 | 10/1996 | DeVaney | 455/560 |
| 5,619,551 | 4/1997 | Yahagi | 455/560 |
| 5,659,601 | 8/1997 | Cheslog | 455/406 |
| 5,666,399 | 9/1997 | Bales et al. | 379/419 |
| 5,673,306 | 9/1997 | Amadaon et al. | 379/59 |

*Primary Examiner*—Thanh Cong Le
*Assistant Examiner*—Sam Bhattacharya
*Attorney, Agent, or Firm*—Hamman & Benn

[57] ABSTRACT

An adjunct processor for a wireless telephone system utilizes object-oriented software for providing a common air-interface protocol for each cell site's base station, so that, regardless of the specific cellular system, it may be coupled to the central, adjunct node-processor of the invention, so that multifarious-operating cellular systems may be linked by the central personal computer adjunct node-processor into one holistic system comprised of many different cellular operating systems and of many node-processors. A network of many adjunct node-processors allows hand-off between adjunct processors, so that if one adjunct processor fails or is down, another adjunct processor in the network may take over its functions. Each adjunct processor also has an alarm-management system, which may take over the alarm-management operation of a down adjunct processor. The object-oriented software of each adjunct processor is comprised of three components: Call-processing, sell-site interface, and matrix switch interface. Each component is comprised of an objects-oriented software and a state table, with the objects-oriented software creating a pointer for the state table.

33 Claims, 8 Drawing Sheets

CELLULAR-TELEPHONE CENTRAL CALL-PROCESSING SYSTEM UTILIZING OBJECT-ORIENTED SOFTWARE IN ADJUNCT PERSONAL COMPUTER

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

BACKGROUND OF THE INVENTION

The present invention is directed to a central call-processing system for a cellular or cellular-like telephone system.

The increasing availability of mobile and portable communications over the past decade has freed business and residential users from the physical constraints of a wholly wired telecommunications network. Cellular communications systems, together with paging and other complementary services, has brought mobility to telecommunications services for the first time. Significant technical advances in mobile and portable technologies, as well as in new technologies such as digital transmission with respect to wireless telecommunications, have substantially expanded the number and types of wireless telecommunications services using the cellular spectrum that can be made available to the user. These prospective services include, but are not limited to, advanced forms of cellular telephone service, advanced digital cordless telephone service, portable facsimile services, wireless private branch exchange services, and wireless local area network services, and may be used through the existing public switched network or through alternative local wired networks (such as cable television systems). As such, digital personal communications systems can exist independently of local wired networks, filling gaps that are existing in current communications systems, and also in creating new markets many yet to be defined. Accordingly, providers of cellular systems, including Personal Communication Systems (PCS), will have the ability to reach and serve existing and new markets, both nationally and globally, in an economic and responsive manner. According to the invention, it is advantageous to construct a hybrid cellular system, that may include a PCS, that is fully compatible with any and all open network interface requirements that may currently exist, or are expected to exist in the future, such that a number of different, hithertofore incompatible cellular systems may be linked together by means of one central processor using multiple common air-interface protocols. Thus, for example, a provider of an Advanced Mobile Phone Service (AMPS) analog cellular phone system, with its one or more base stations and local cellular customers, may be directly and wirelessly linked, for example, to a provider of the Global System for Mobile Communications (GSM) digital cellular system, or, either or both of the above may be linked to a provider of the Nordic Mobile Telephone (NMT) 450 Mhz.-frequency cellular system, or to a provider of the Extended Total Access Cellular System (E-TACS).

Each of the above-mentioned cellular systems has its own specifications and protocols that have hithertofore prevented ready and easy coupling of one system with another system, which has prevented a cellular call from one type of system to be made to another type of system without having to be first routed through the public switched telephone network (PSTN).

Traditional, wireless communication systems, such as those named above, typically implement the call-control and real-time operational activities in the actual switching exchange equipment connected to the PSTN, while all other activities are handled in an external, dedicated, adjunct platform computer. Such systems must route their calls through the PSTN, if a call is being made to another type of cellular system, as above-described. Since the call-control and real-time operational activities are embedded in the actual switching exchange equipment, any upgrade or change to the system is considerably time-consuming and costly, often necessitating replacement of switching equipment hardware.

Owing to the fact that conventional cellular systems require such switching-equipment control, such systems require very complicated and decentralized billing schemes. These prior-art systems rely on external billing computer platforms to process call detailing information. This information is typically downloaded only once or twice a month to the cellular provider. Therefore, the time period between a placement of a call and the time that the call is billed may be a month or so, often allowing a subscriber to surpass his prescribed monthly call-limit.

Traditional cellular systems require separate and specific processing platforms to support the mobility and network administration functions of the system, and thus require duplication of such platforms to provide back-up capability.

SUMMARY OF THE INVENTION

The present invention is a marked improvement over these prior-art systems and the limitations described above that are inherent in them. The invention utilizes object-oriented software for providing a common air-interface protocol for each cell site's base station, so that, regardless of the specific cellular system, it may be coupled to the central personal computer adjunct node-processor of the invention, so that multifarious-operating cellular systems may be linked by the central personal computer adjunct node-processor into one holistic system comprised of many different cellular operating systems and of many node-processors.

Also, according to the invention, each central personal computer adjunct node-processor controls the connections of each call made to a linked base station, whether the call is to another cell-site within the overall system, whereby the call need not be passed to the PSTN, or whether the call is made to a telephone subscriber serviced only by the PSTN.

Since the central personal computer adjunct node-processor controls all call-connections of each cell-site, any and all billing information may be, and is, carried out at each central personal computer adjunct node-processor, so that relatively instantaneous subscriber-status information may be had, whereby call-limits, and the like, are prevented from being exceeded.

Since each central personal computer adjunct node-processor of any one hub uses the same platform, many nodes of different hubs may be connected together. Since each central personal computer adjunct node-processor of a hub performs all of the mobility functions required by the system's hub of which it is part, such as call hand-off, roaming, etc., the functions of any one central personal computer adjunct node-processor may be taken over by a central personal computer adjunct node-processor of another hub, so that upon a central personal computer adjunct node-processor's breakdown, another central personal computer adjunct node-processor of a different hub may temporarily take over its processing functions.

BRIEF DESCRIPTION OF THE DRAWINGS

The invention will be more readily understood with reference to the accompanying drawing, wherein.

DETAILED DESCRIPTION OF THE INVENTION

Figure 1:
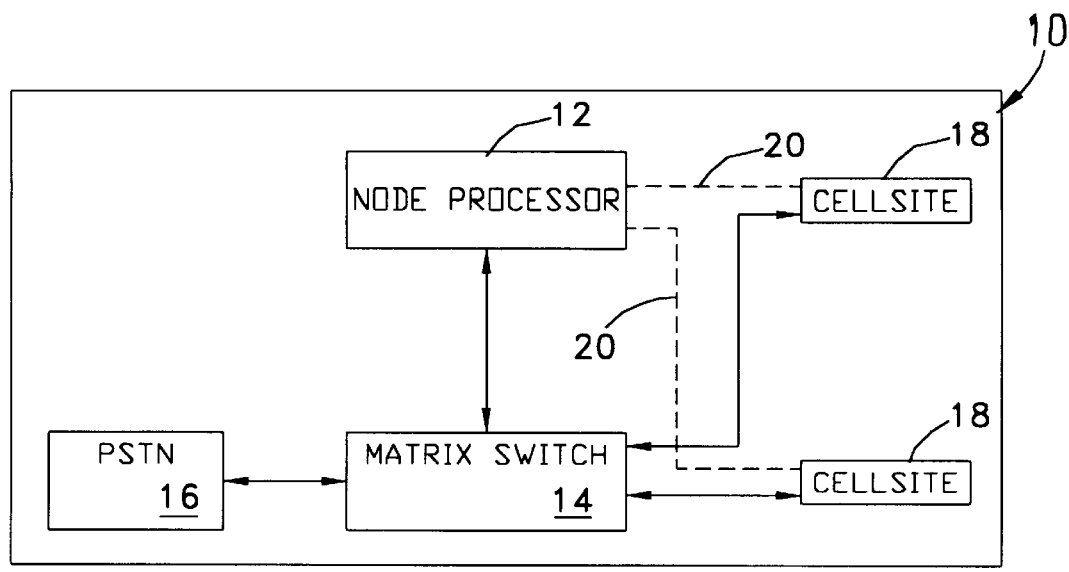
FIG. 1 is a block diagram of a node of the wireless telephone system of the invention.

Referring now to the drawings in greater detail, FIG. 1 shows a block diagram of the wireless cellular node-system 10 of the invention, in which the novel software of the invention is employed. The system 10 is comprised of at least one hub, and preferably many hubs forming a network, each hub having a central personal computer adjunct node-processor 12, which in the preferred embodiment, is a Sun Sparc 10 workstation based on UNIX operating system. The node-processor 12 is the system-controller of the hub, and performs all of the central functions of the hub, as detailed below, including all billing and call-handling functions. The remaining hardware of the hub is a matrix switch 14 coupled between the adjunct node-processor 12 and the PSTN 16. The matrix switch 14 is conventional, such as LNX 2000 matrix switch, manufactured by Excel, Inc. of Hyannis, Mass. The actual link between the matrix switch and the PSTN is based on a time-division multiplex pulse-code modulation and delta modulation, well-known to those skilled in the art. The matrix switch is connected by wire or microwave link to a plurality of cell-sites 18, 18'. According to the invention, each cell-site may be of a different protocol from that of another. For example, the cell-site may be a base station of a GSM system, while the cell-site 18' may be a base station associated with an AMPS-based system or an E-TACS system. Since, as described below, the object-oriented software of the invention provides what may be called a generic interface process, all cellular systems may be readily and easily connected together, and controlled by a central personal computer adjunct node-processor 12. The central personal computer adjunct node-processor 12 is linked to cell-sites 18, 18' preferably by the same physical connection that links the matrix switch 14 with the cell-sites, or may be separate wiring 20.

The central personal computer adjunct node-processor 12 handles all aspects of call-processing. Calls from the PSTN users 16 are delivered to the matrix switch 14 via central-office trunks. The matrix switch 14 receives the digits of the telephone number to be called and serviced by the central personal computer adjunct node-processor 12, which digits are forwarded to the central personal computer adjunct node-processor 12. The adjunct node-processor 12 performs a number of checks to verify that the destination is valid, and is allowed to receive the call, or is not currently busy. Once validated, the adjunct node-processor 12 instructs the base-station's transceiver (BTS) to transit a page-message over the hailing channel to the destination-mobile phone. If the message is received, the mobile phone confirms the page, and is directed to tune to the desired voice channel frequency, in the conventional manner. The mobile phone is then in an "alert" state, and starts ringing. If the call is then answered, the base station indicates to the adjunct node-processor 12 that the mobile phone has gone off-hook. At this time, the adjunct node-processor computer 12 instructs the matrix switch 14 to connect the inbound central office call to the audio trunk of the base station, thereby connecting the call. The adjunct node-processor 12 also logs the call-information, including the start-time and the user-number.

If a call is originated by a user of the wireless system itself, the mobile phone sends an inbound message to its base station, indicating a request for service. The base station responds by either allocating a voice channel for the call and directing the mobile unit to that voice channel, if the call destination is to another mobile unit serviced by the adjunct node-processor 12 of that hub or of a different hub. If the destination is a number serviced by PSTN 16, then the base station forwards the request to the node processor 12 for validation, which instructs the base station what voice channel to use. The adjunct node-processor than instructs the matrix switch 14 to seize an outbound trunk to PSTN, and dials the digits of the destination-party. The adjunct node-processor then directs the switch to connect the base station's audio trunk to the outbound trunk, in the conventional manner, whereby the mobile-phone user may hear the call-progress tones from the network, such as busy or ringing. When the call is terminated, the adjunct node-processor opens the call-information record files used to log the call-details for billing purposes, as discussed in greater detail hereinbelow.

Figure 2:
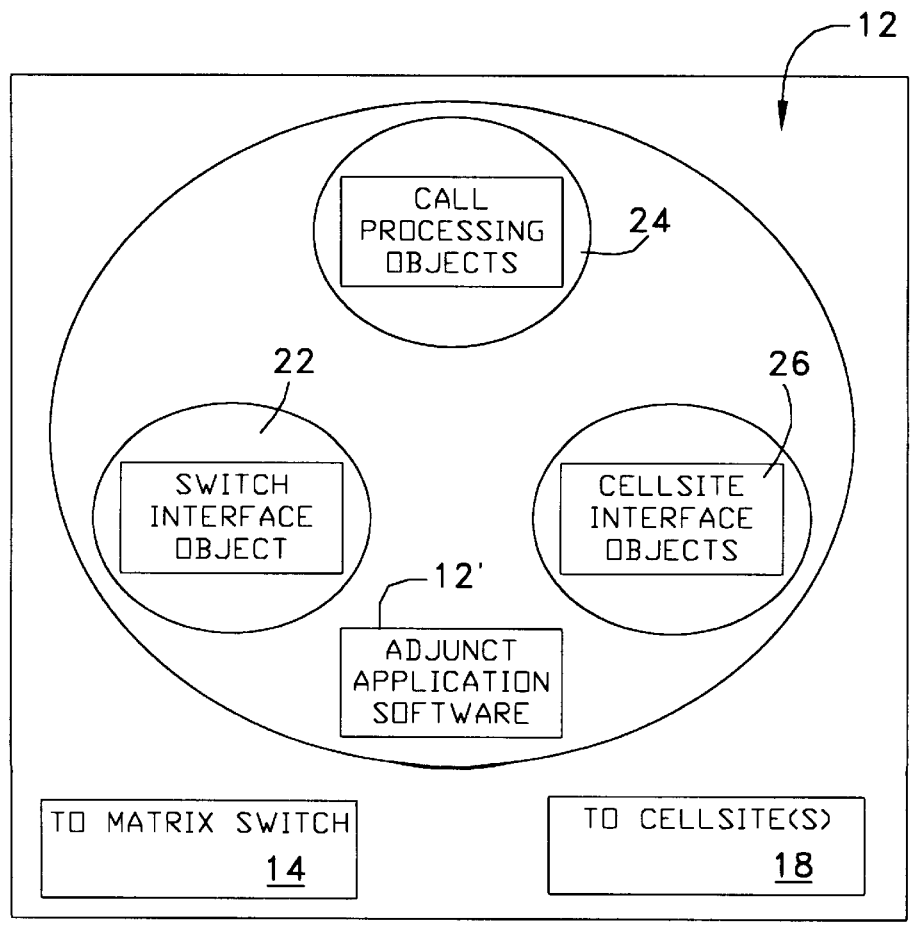
FIG. 2 is a block diagram showing the component-parts of the objects-oriented software of the adjunct node-processor.

Referring to FIG. 2, the adjunct node-processor 12 is controlled by specific object-oriented software 12' consisting of a number of component-parts created by UNIX processes. These component-parts are: A matrix-switch interface object software 22 that is used to interface and communicate with the matrix switch 14; call-processing object software 24 containing the necessary data and functions to control all high-level aspects of call-control; and multiple cell-site interface object software 26 allowing the system to accommodate a diverse set of cell-sites using different specifications and protocol. The software listing for these programs are shown hereinbelow.

Each call-event is delivered to the "Call-Objects" component 24 of the software for message received from the matrix switch interface software 22 and cell-site interface software 26. The "Call-Objects" program maintains a pointer for each current call which references the current state of the call in a table called "Call-State Table". The "Call-State Table" defines the sequence of states and actions taken for a call, based on events received. The subscriber data base is the repository of all subscriber's pertinent information, such as phone number, and service profile. Call-events delivered to the "Call Objects" program invoke methods which cause the program to perform the actions specified in the "Call-State Table", and to move the pointer to the next, defined state.

Figure 3A:
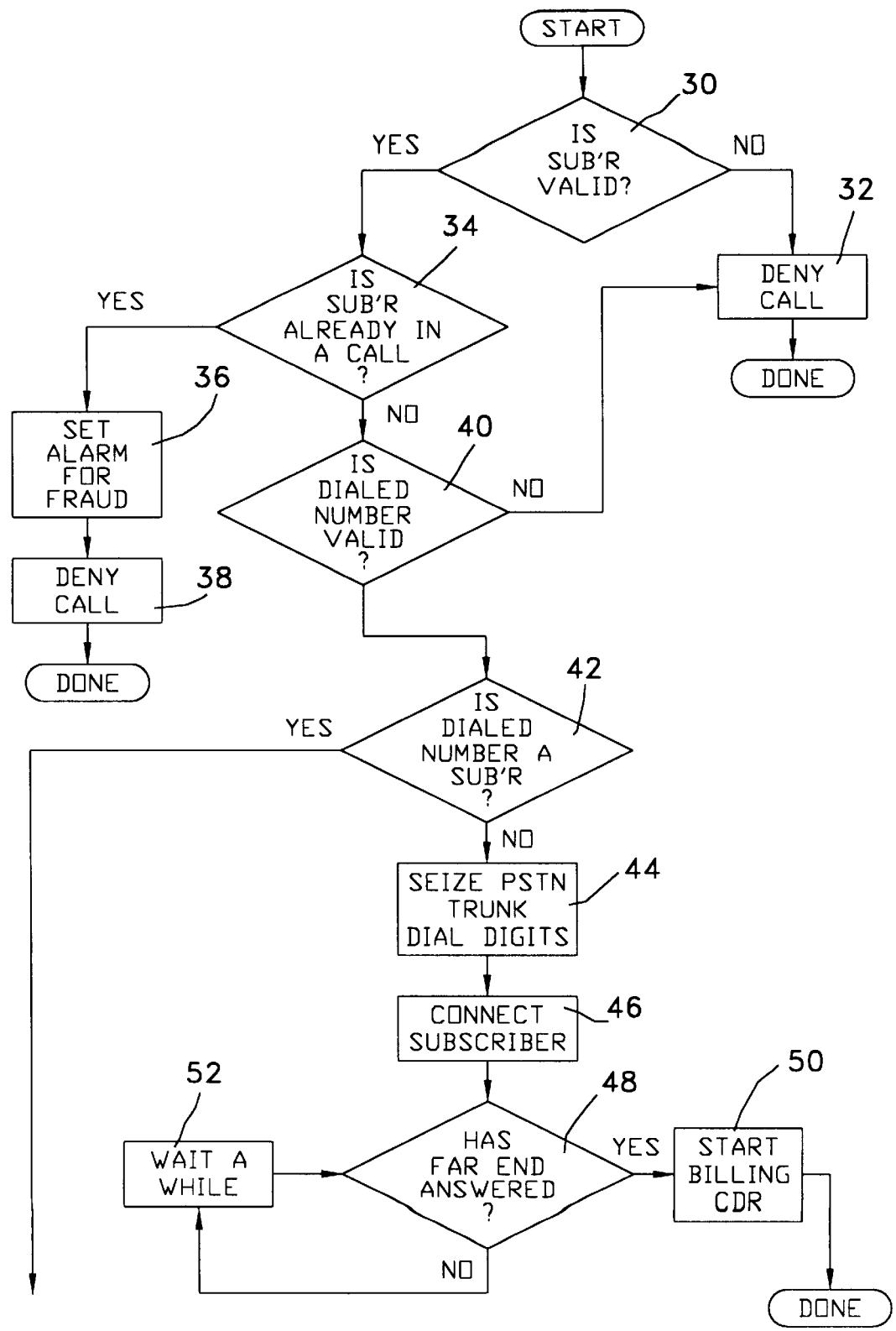
FIGS. 3–4 are flow charts showing the call-processing component of the objects-oriented software of the adjunct node-processor.
Figure 3B:
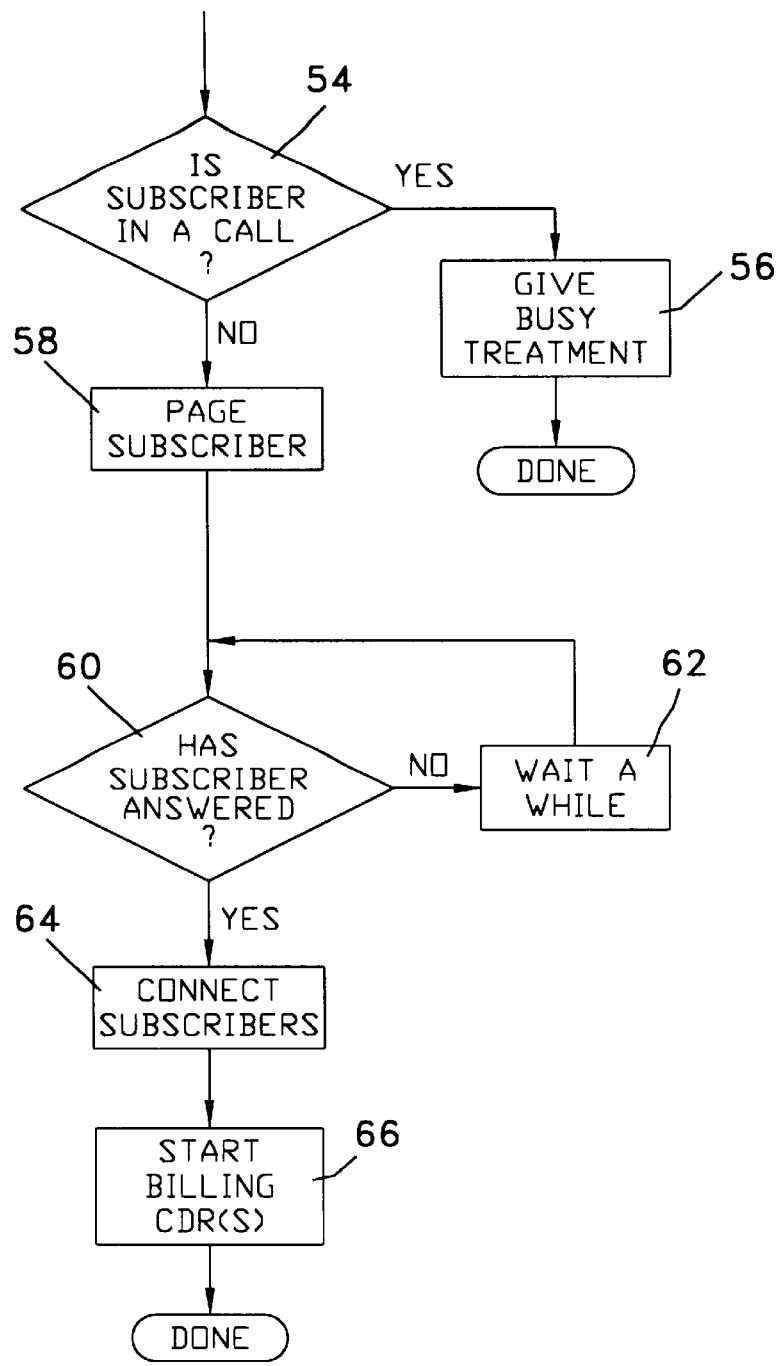

Referring now to FIGS. 3 and 4, there are shown flow charts depicting the events performed by the above-described software application-components of the adjunct node-processor 12. FIGS. 3A and 3B deal with the case when the mobile-subscriber is the originator of the call. The "Call-Processing Objects" software determines if the subscriber is a valid one (Block 30). If not, the call is denied (block 32). If it is a valid call, then the software determines if that subscriber is already in a call (step 34), and if YES, then an alarm is set (block 36) indicating fraud, and the call is denied (block 38). If the subscriber is not in a call, then the number dialed by the subscriber is checked to see if it is valid (step 40), and if NO, then the call is denied (block 32). If the number is valid, then the applications program will determine if the dialed, or called, number is also a subscribe or not (step 42). If NO, then the adjunct node-processor instructs the matrix switch 14 to seize a PSTN trunk line and to dial out the digits to the PSTN (block 44). Thereafter, the call is connected (block 46), and then the program determines if the call has been answered by the called party (step 48). If YES, then the adjunct node-processor starts the billing process (block 50). If NO, then a waiting period is commenced (block 52). If after a preset time period the call is not answered, the adjunct node-processor will instruct the matrix switch to disconnect.

Referring to FIG. 3B, if the called party is also a subscriber serviced by the adjunct node-processor 12, then the call-processing objects application software of the adjunct node-processor will determine if the called subscriber is already on a call (step 54). If YES, then a busy signal is generated locally by the adjunct node-processor (block 56). If NO, then that called mobile subscriber is paged by signaling the base station associated with that subscriber from the adjunct node-processor 12 (block 58). The program then determines if the called subscriber has answered (step 60), and if No, then a waiting period is generated to give time for answering (block 62). When the called subscriber answers, the two subscribers are connected together ((block 64) by means of the adjunct node-processor, and bypassing the matrix switch, regardless of the type and specifications of the cellular systems of the two subscribers. After connection, the adjunct node-processor starts the billing (block 66).

Figure 4A:
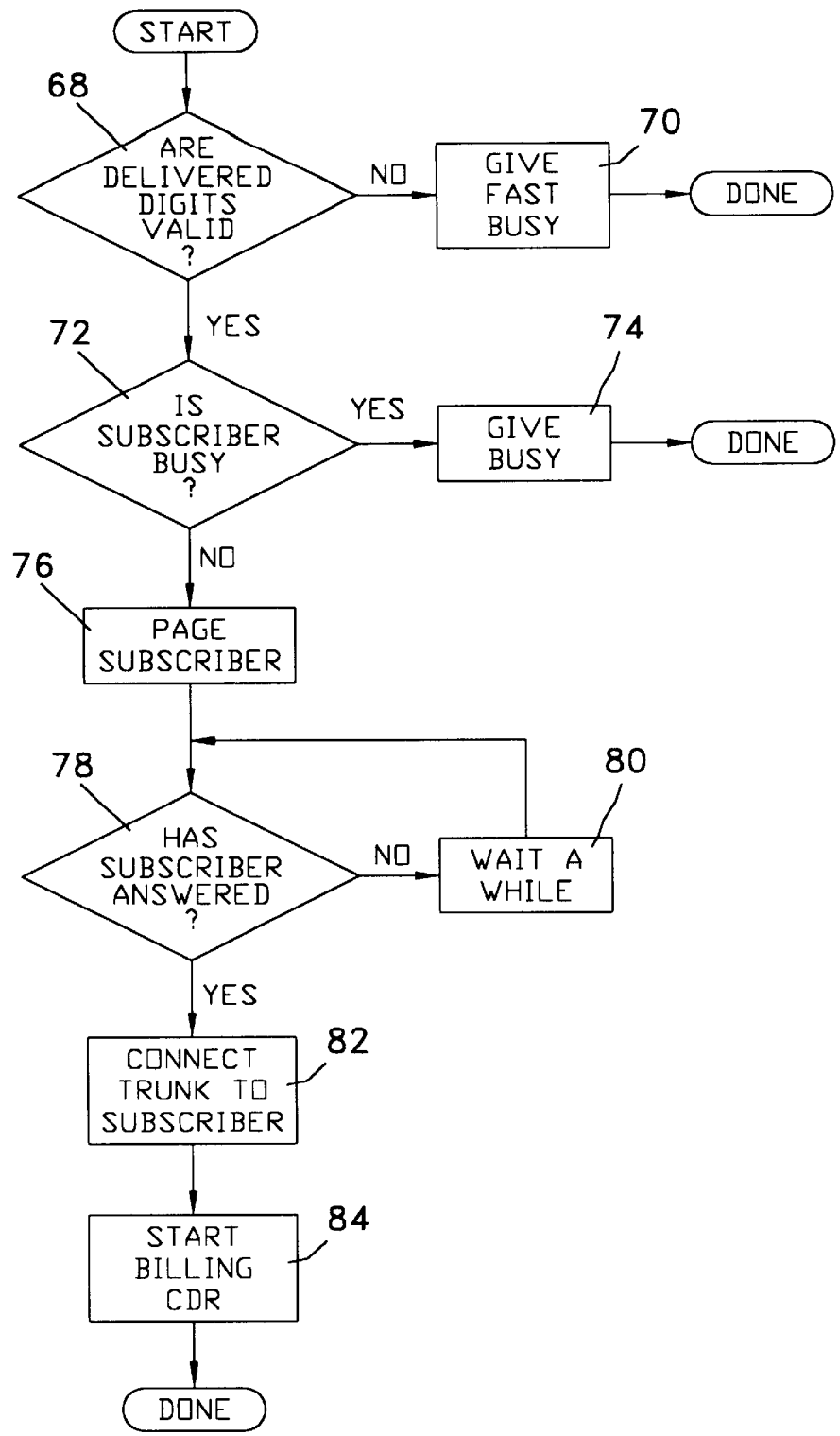

Referring now to FIGS. 4A, there is shown what steps the call-processing objects application software of the adjunct node-processor 12 performs if the originating call is from a PSTN user. The adjunct node-processor first determines if the digits called are valid (step 68), and if not valid, then a fast busy-signal is generated (block 70). If the digits are valid, then the adjunct node-processor determines if the called subscriber's mobile phone is busy (step 72). If YES, then a regular busy-signal is generated (block 74). If the called subscriber's phone is not busy, then that called mobile subscriber is paged by signaling the base station associated with that subscriber from the adjunct node-processor 12 (block 76). The program then determines if the called subscriber has answered (step 78), and if NO, then a waiting period is generated to give time for answering (block 80). When the phone is answered, the PSTN trunk line is connected via the matrix switch 14 to the base station servicing the called subscriber (block 82), and the adjunct node-processor 12 starts the billing period (block 84).

Figure 4B:
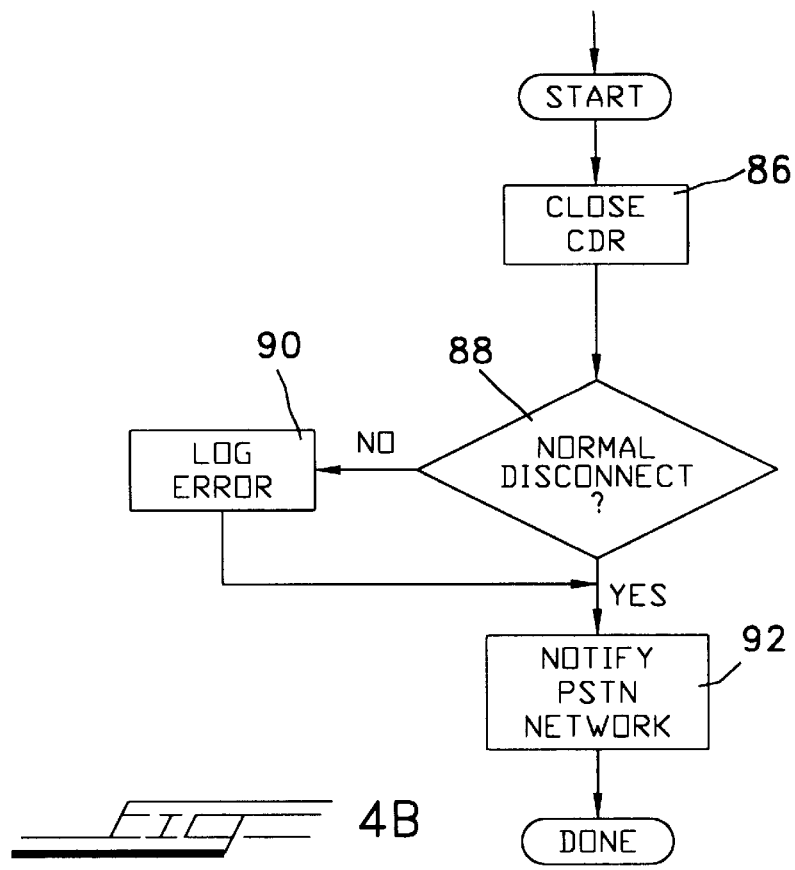
Figure 4C:
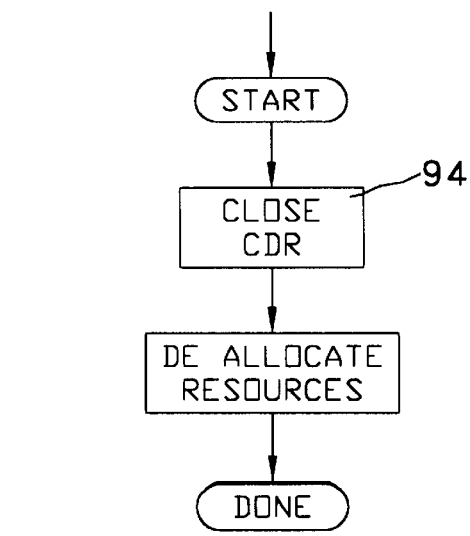

FIGS. 4A and 4B show the steps involved when the call is terminated for both PSTN-initiated calls and subscriber-initiated calls. If the subscriber terminates the call, then the adjunct node-processor 12 stops the billing period (block 86), and the call is disconnected. The applications software of the adjunct node-processor 12 determines if there was normal disconnect (step 88), and if NO, then a log-error is indicated (block 90), and the PSTN notified (block 92). If the PSTN-party hangs up, then the billing by the adjunct node-processor 12 is also stopped (block 94, FIG. 4C).

The following is the source code listing of the call-processing objects application of the adjunct node-processor 12 for carrying out the above-described steps. In the software listing, there is reference to "State Table", which is the state machine described and discussed hereinbelow in detail.

---

```
To:       gullifor @ pwgi.com @ inet
cc:       (bcc: Dan Gulliford/Phoenix Wireless Group Inc)
From:     chris @ wormhole.pwgi.com (Chris Matthies) @ inet
Date:     06/03/96 04:07:28 PM
Subject:  patent
- - - - - - - - - -
X-Sun-Data-Type: text
X-Sun-Data-Description: text
X-Sun-Data-Name: text
X-Sun-Charset: us-ascii
X-Sun-Content-Lines: 1
Here is some stuff hope it helps.
- - - - - - - - - -
X-Sun-Data-Type: default
X-Sun-Data-Description: default
X-Sun-Data-Name: junk.dat
X-Sun-Charset: us-ascii
X-Sun-Content-Lines: 335
//- - - - - - - - - - - - - - - - - - - - - - - - - - - - - - - - - - - - - - - - - - - - - - - - - - -
void
CallRecords::ex2cp__req__for__service__with__addr( )
{
    char *where = "CallRecords::ex2cp__req__for__service__with__addr: (IPC) ";
```

```
    // extract the incoming call message
    ipc->get_msg( );
    // get the elements of the IPC message
    int seqnum;
    char *dialnumber;
    char *dialednumber;
    *ipc >> seqnum >> dialednumber >> dialnumber;
    OTCLIB_TRACER(WCP >= 1) << endl << where << timestamp( ) << endl;
    OTCLIB_TRACER(WCP >= 1) << "Incoming Call - Trunk to Mobile" << endl;
    OTCLIB_TRACER(WCP >= 1) << "sequence number:" << seqnum << endl;
    OTCLIB_TRACER(WCP >= 1) << "dial number:" << dialnumber << endl;
    OTCLIB_TRACER(WCP >= 1) << "dialed number:" << dialednumber << endl;
    // generate a unique call id
    IdType callId;
    IdType timerId;
    callId = Call::callIdCount > 65000 ?
        Call::callIdCount = 1, Call::callIdCount++ : Call::callIdCount++;
    timerid = Call::timerIdCount > 65000 ?
        Call::timerIdCount = 1, Call::timerIdCount++ ; Call::timerIdCount++;
    // send callid immediately to the excel
    ipc->create_msg( );
    *ipc << callId << seqnum;
    ipc->send_msg("cp2excReqForServiceWithAddrAck");
    // create a call record for this call
    //       swCallId = portNumber
    Call *call = new Call(TRUNK_TO_MOBILE, 0, callId, timerId, 0, "",
                    dialednumber, dialnumber, "", "", "", -1);
    _guimsg.trace(call,"%s%s incoming Call - T->M dial: %s dialed: %s callid: %u\n",
                where, timestamp( ), dialnumber, dialednumber,
call->callid( ));
    // print out timer into
    call->printTimer(where);
    // insert the call record in the call record table
    insert_cid(call->callid( ), call);
    // remove all calls that are aged, an aged call has same dial number as the incoming call
    //OTCLIB_TRACER(WCP >= 2) <<"removing all AGED records with dial number:"
    //    < dialnumber << endl;
    //remove_dialnum_callrec(dialnumber, callId);
    // send the call to the gui and increment stats
    _guimsg.display_call(call);
    callStatsMsgKit->increment_calls( );
    // start speech timer
    call->start_speech_timer( );
    // send event to the state table
    call->event(INCOMING_CALL);
}
// method binding structure for use in action mapping for state table
static SemAction Rec call_bd_rec[ ] = {
    {"LookUpLib",           (SEM_action_memfnp)&Call::LookUpLib},
    {"CheckMobileBusy",     (SEM_action_memfnp)&Call::CheckMobileBusy},
    {"PageRequest",         (SEM_action_memfnp)&Call::PageRequest},
    {"NoOp",                (SEM_action_memfnp)&Call::NoOp},
    {"SleepMicro",          (SEM_action_memfnp)&Call::SleepMicro},
    {"SleepSeconds",        (SEM_action_memfnp)&Call::SleepSeconds},
    {"SleepSeconds1",       (SEM_action_memfnp)&Call::SleepSeconds1},
    {"SleepSeconds2",       (SEM_action_memfnp)&Call::SleepSeconds2},
    {"SendRelReq",          (SEM_action_memfnp)&Call::SendRelReq},
    {"CallCleanUp",         (SEM_action_memfnp)&Call::CallCleanUp},
    {"SendRelConf",         (SEM_action_memfnp)&Call::SendRelConf},
    {"Validate",            (SEM_action_memfnp)&Call::Validate},
    {"SendAccept",          (SEM_action_memfnp)&Call::SendAccept},
    {"SendDeny",            (SEM_action_memfnp)&Call::SendDeny},
    {"LookUpCircuit",       (SEM_action_memfnp)&Call::LookUpCircuit},
    {"ConverDialedNumToMin",(SEM_action_memfnp)&Call::ConverDialedNumToMin},
    {"Speech",              (SEM_action_memfnp)&Call::Speech},
    {"Teardown",            (SEM_action_memfnp)&Call::Teardown},
    {"CstaDivertToRingBack",(SEM_action_memfnp)&Call::CstaDivertToRingBack},
    {"CstaDivertToEM",      (SEM_action_memfnp)&Call::CstaDivertToEM},
    {"CstaDivertToBusy",    (SEM_action_memfnp)&Call::CstaDivertToBusy},
    {"CstaDivertToReorder", (SEM_action_memfnp)&Call::CstaDivertToReorder},
    {"CstaMakeCall",        (SEM_action_memfnp)&Call::CstaMakeCall},
    {"CstaClearCall",       (SEM_action_memfnp)&Call::CstaClearCall},
    {"CstaAckCallId",       (SEM_action_memfnp)&Call::CstaAckCallId},
    {"BeginBilling",        (SEM_action_memfnp)&Call::BeginBilling},
    {"EndBilling",          (SEM_action_memfnp)&Call::EndBilling},
    {"ExOutSeize",          (SEM_action_memfnp)&Call::ExOutSeize},
    {"ExLocalSeize",        (SEM_action_memfnp)&Call::ExLocalSeize},
    {"ExConnect",           (SEM_action_memfnp)&Call::ExConnect},
    {"ExReleaseChannel",    (SEM_action_memfnp)&Call::ExReleaseChannel},
    {"ExReleaseSepChannel", (SEM_action_memfnp)&Call::ExReleaseSepChannel},
```

-continued

```
    {"ExConnectRingBackPattern",   (SEM_action_memfnp)&Call::ExConnectRingBackPattern},
    {"ExConnectBusyPattern",       (SEM_action_memfnp)&Call::ExConnectBusyPattern},
    {"ExConnectReOrderPattern",    (SEM_action_memfnp)&Call::ExConnectReOrderPattern},
    {"ExDisConnectTonePattern",    (SEM_action_memfnp)&Call::ExDisConnectTonePattern},
    {"ExGenCallProcEvent",         (SEM_action_memfnp)&Call::ExGenCallProcEvent},
    {"ExRecAnnounceConnect",       (SEM_action_memfnp)&Call::ExRecAnnounceConnect},
    {"Counter",                    (SEM_action_memfnp)&Call::Counter},
    {0,0 }
};
#ifdef min
#undef min
#endif
// static variables . . .
IdType   Call::callIdCount = 1;
IdTyep   Call::timerIdCount = 1;
long     Call:setupTime = 45;
long     Call:teardownTime = 45;
short    Call::isInit = 0;
SPString Call::basePath = "";
//- - - - - - - - - - - - - - - - - - - - - - - - - - - - - - - - - - - - - - - - - - - - - - -
Call::Call(const int callType, const int bts, const IdType cld, const IdType tid,
           const IdType bportNum, const char *portNum, const char* dialedNum,
           const char* dialNum, const char *mn, const char *emD, const char *en,
           const short circ):
    callId(cid),
    timerId(tid),
    portNumber(portNum),
    dialNumber(dialNum),
    dialedNumber(dialedNum),
    emDigits(emD),
    min(mn),
    esn(en),
    acctCode("0000"),
    readyForDisplay(0),
    btsportNumber(bportNum),
    callSetupTime(0),
    callTearDownTime(0),
    callStatus(""),
    acceptProfTimer(0),
    _cleanuploh(0),
    _specialCall(0),
    _billRc(0),
    _gui(callRecs.gui( )),
    _cdr(callRecs.cdr( )),
    callState(-1)
{
    char *where = "Call::Call ";
    circuit[0] = circ;
    circuit[1] = 0;
    btsNumber[0] = bts;
    btsNumber[1] = -1;
// init the environment variables
    _initenv( );
    // create a state event matrix for this call
    // using the call type to determine which table to pass to
    // the state machine
    typeOfCall = callType;
    callSetupTime = time((time_t *)0);
    switch (callType) {
        case TRUNK_TO_MOBILE: // trunk to mobile call
        sem = new Sem(trunk2mobileTbl, WACS_IDLE, this); // create SEM object
using trunk to mobile state table
            break;
        case MOBILE_TO_TRUNK: // mobile to trunk call
        sem = new Sem(mobile2trunkTbl, WACS_IDLE, this); // create SEM object
using mobile to trunk state table
            break;
        case MOBILE_TO_MOBILE: // mobile to mobile call
        sem = new Sem(mobile2mobileTbl, WACS_IDLE, this); // create SEM object
using mobile to mobile state table
            break;
    }
    // setup call timers, send this new call to the gui is degug on
    initialize_timers( );
    call_data_gui( );
    sem->set_trace_proc(tracer);
]
//- - - - - - - - - - - - - - - - - - - - - - - - - - - - - - - - - - - - - - - - - - - - - - -
Call::Call(const int callType)
    : callId(0),
```

```
            timerId(0),
            readyForDisplay(0),
            btsportNumber(0),
            _specailCall(1),
            acceptProfTimer(0),
            _cleanuploh(0),
            _gui(callRecs.gui( )),
            _cdr(callRecs.cdr( )),
            callState(-1)
{
    char *where = "Call::Call";
    circuit[0] = 0;
    circuit[1] = 0;
    btsNumber[0] = -1;
    btsNumber[1] = -1;
    // init the environment variables
    _initenv( );
    // get the base path for the data files
    SPString assocStateData = basePath;
    assocStateData      += "/config/TrkMobileStates.h";
    SPStringassocStateDataCmp = basePath;
    assocStateDataCmp    += "/config/TrkMobileStates.state.h.comp";
    SPStringassocEventDataCmp = basePath;
    assocEventDataCmp   += "/config/TrkMobileStates.event.h.comp";
    // create a state event matrix for this call
    // using the call type to determine which table to pass to
    // the state machine
    SPString stateTable;
    SPString stateTableCmp;
    switch (callType) {
        case TRUNK_TO_MOBILE: // trunk to mobile call
            // create a SEM object using the trunk to mobile state table
            sem = new Sem(trunk2mobileTbl, WACS_IDLE);
            // get the name and location of the trunk to mobile state table
            stateTable   = basePath;
            stateTable      += calRecs.tr2mb_name( );
            stateTableCmp   = stateTable + ".comp";
            sem->compile_table(assocStateData, call_bd_rec, stateTable,
                        stateTableCmp, assocStateDataCmp,
assocEventDataCmp);
            break;
        case LOAD_TRUNK_TO_MOBILE: // trunk to mobile call from a file
            // create a SEM object using the trunk to mobile state table in a compile
form
        sem = new Sem(trunk2mobileTbl, WACS_IDLE);
            // get the name and location of the trunk to mobile state table
            stateTable   = basePath;
            stateTable      += callRecs.tr2mb_name( );
            stateTableCmp   = stateTable + ".comp";
            sem->load_state_table(stateTableCmp, call_bd_rec);
            sem->load_assoc_table(assocStateDataCmp, assocEventDataCmp);
            break;
        case MOBILE_TO_TRUNK: // mobile to trunk call
            // create a SEM object using the trunk to mobile state table
            sem = new Sem(mobile2trunkTbl, WACS_IDLE);
            // get the name and location of the trunk to mobile state table
            stateTable   = basePath;
            stateTable      += callRecs.mb2tr_name( );
        stateTableCmp   = stateTable + ".comp";
            sem->compile_table(assocStateData, call_bd_rec, stateTable,
                        stateTableCmp, assocStateDataCmp,
assocEventDataCmp);
            break;
        case LOAD_MOBILE_TO_TRUNK: // mobile to trunk call
            // create a SEM object using the trunk to mobile state table in a compile
form
            stateTable   = basePath;
            stateTable      += callRec.mb2tr_name( );
            stateTableCmp   = stateTable + ".comp";
        sem = new Sem(mobile2trunkTbl, WACS_IDLE);
            // get the name and location of the mobile trunk state table
            sem->load_state_table(stateTableCmp, call_bd_rec);
            sem->load_assoc_table(assocStateDataCmp, assocEventDataCmp);
            break;
    case MOBILE_TO_MOBILE: // mobile to mobile call
            // create a SEM object using the mobile to mobile state table
        sem = new Sem(mobile2mobileTbl, WACS_IDLE);
            // get the name and location of the mobile to mobile state table
            stateTable   = basePath;
            stateTable     += callRec.mb2mb_name( );
```

-continued

```
            stateTableCmp   = stateTable + ".comp";
                sem->compile_table(assocStateData, call_bd_rec, stateTable,
                                    stateTableCmp, assocStateDataCmp,
assocEventDataCmp);
                break;
            case LOAD_MOBILE_TO_MOBILE: // mobile to mobile call
                // create a SEM object using the to mobile state table in a compile form
                stateTable      = basePath;
                stateTable      += callRecs.mb2mb_name( );
            stateTableCmp   = stateTable + ".comp";
            sem = new Sem(mobile2mobileTbl, WACS_IDLE);
                // get the name and location of the mobile to trunk state table
                sem->load_state_table(stateTableCmp, call_bd_rec);
                sem->load_assoc_table(assocStateDataCmp, assocEventDataCmp);
                break;
    }
}
//- - - - - - - - - - - - - - - - - - - - - - - - - - - - - - - - - - - - - - - - - - - - - - -
Call::~Call( ){
    // remove all gui call entries
    if ( ipc && !_specialCall ) {
        _gui.remove_call_callid(this);
        if ( btsNumber[0] != -1 )
callStatsMsgKit->update_rfstats_gui(btsNumber[0]);
        if ( btsNumber[1] != -1 )
callStatsMsgKit->update_rfstats_gui(btsNumber[1]);
            callStatsMsgKit->update_swstats_gui( );
            callStatsMsgKit->update_sysstats_gui( );
    }
    // remove the state machine
    if ( sem )
        delete sem;
    if ( acceptProfTimer )
        delete acceptProfTimer;
    // remove dispatched timers
    if ( _cleanuploh ) {
        OTCLIB_TRACER(WCP >= 2) << "DESTRUCTOR removing all timers" << endl;
        remove_call_timers( );
        delete_cleanuploh;
    }
}
```

As mentioned above, traditional wireless, telephony communication systems typically implement call control and real-time operational activities in software that execute on switching exchange equipment. The intelligence of those systems is effectively embedded in software source code, and is not expressed explicitly. As a result, changes to call processing, for example, to provide new customer service or features, often require extensive changes to the software at the switching exchange equipment. In contrast, the system of the invention uses a different and unique approach to the issue of implementing call-processing system intelligence in a software-defined architecture.

Call processing in the wireless telephony system of the invention requires that the system perform specific tasks and provide certain responses or actions as a result of the defined stimuli. These stimuli are typically external requests for service from users. A model of the system as a call-state machine is created. In this call-state machine, a discrete, finite set of states defines all possible conditions for the system. A stimulus or event typically causes a change in state, as well as initiating the machine to generate appropriate responses. For example, assuming the system of the invention is in an "idle" state, an event such as call origination from the PSTN, as discussed above in reference to FIG. 4A, may be received. The "Call-Processing Objects" software determines then enters a state to determine the validity of the called party state, and performs the defined response, which, in this case, is to send an appropriate acknowledgment-message back to the PSTN. Thus, this call-processing may be expressed in tabular form as:

| Current State | Event | Next State | Action |
|---|---|---|---|
| Idle | PSTN Originate | Validate | Ack. |

Unlike traditional call-processing software, where the events and actions are typically executed as a "if-then-else" method, used in languages such as C, Pascal, etc., the software of the invention utilizes a "Call-State Table" that is stored as an ASCII file. According to the invention, the "Call-State Table" is comprised of three distinct tables; one for each of the defined call types, i.e. mobile-to-mobile, mobile-to-PSTN-network, and PSTN-network-to-mobile. When the system is first started up, the system scans the entire contents of the state-file, and builds a compiled, complex data array in memory. The array contains a location for each of the defined call-states in the table, as well as response-function pointers (execution addresses) for the defined response routines.

When a call is first initiated on the system, the software's call-processing object creates a pointer to the table, which tracks the current state of the call. Other calls occurring simultaneously on the system are allocated their own unique pointer by the call-processing object, which may or may not point to the same state. This use of pointers eliminates the need to replicate the table in its entirety for each call in the system. When an event for a call-in-progress is received, the call-object software first determines which call (out of many possible calls current on the system) is involved; then, using the current-state pointer for that call, queries the call-state table to determine what state to advance the current state-pointer, along with what response-action(s) are to be performed. Assuming that the event is valid for the current state, the call-processing object software performs the necessary actions, and updates the current state-pointer accordingly. If the event is determined to be invalid (perhaps a nonsensical event, e.g. a "hang up" from a mobile before it has been told to ring), the call-object performs appropriate standard error-treatment, which usually means premature call tear-down. This "catch all" relieves the system engineer from the burden of having to explicitly define a table-entry for each state against every known possible event, in order to prevent the state-machine from hanging up when an unexpected stimulus has been received.

Implementation of the call-processing state-machine in this manner results in a number of key advantages.

1. Improved legibility of system logic. The system's intelligence is defined by the table directly, rather than by the translation into source code, as is the case of traditional approaches. In order for the system engineer to understand and/or change what the system does, he simply reads and modifies the table directly, rather than perusing source code. This allows telephone-system engineers with no understanding of source-code software language to accurately define, implement and test the prescribed call-processing operations.

2. Field modifiable operation. As noted previously, the state-table defines a complex, often lengthy sequence of states and actions to be taken as the system responds to external stimuli. The state-stable presupposes that the external stimuli will conform to some standard sequence, as laid down by international standards committees such as ITU. In practice, the interpretation of these standard sequences by system operators is often not consistent. It often is necessary to be able to change the call-processing flow to allow for unforeseen deviations from the expected sequence of stimuli. The systems engineer can do this, on site, by simply modifying the ASCII file with a standard text editor for word processor, then restarting the system. The changes are, thus, effected immediately, without the need for on-site compilation of the system software.

3. Rapid feature deployment. This ability to easily modify call processing by systems-engineers without recourse to programmers or software compiler and linker-tools significantly streamlines the development process, allowing for rapid development of features and functions in time-frames not feasible using a traditional software approach.

The three tables of the call-processing actual state-machine tables used in the invention are as follows. The first state-table is the "mobile-to-mobile state/event table". The second state-table is the "mobile-to-trunk state/event table". The third state-table is the "trunk-to-mobile state table". Each entry is based on the above listed example. That is, there are three column-entries which define: the current state to which the pointer may be directed, the event associated therewith, and then the next state to which the call-processing software is to be directed, and, finally, on the line or lines under these three column-entries, the action or actions required to be performed are listed. The pointer for the call-processing state-machine is controlled by the call-processing object software listed and discussed above. Because of the arrangement of the state machine, an operator need only be trained to call up the state machine, but he does not have to know software language or encoding, since the state machine clearly expresses to him his options in plain language. Thus, for an operator to make changes and updates to the state table, as for example changing the service of a present subscriber or adding a new one, he need only call up the state table and make the changes required, which is a relatively simple task.

JUN.-10' 96(MON) 11:36   PHOENIX WIRELESS GR         TEL:14076671101                P.004

To:       gullifor @ pwgi.com @ inet
cc:       (bcc: Dan Gulliford/Phoenix Wireless Group Inc)
From:     chris @ wormhole.pwgi.com (Chris Matthies) @ inet
Date:     06/10/96 10:28:24 AM
Subject:  state tables ----------
X-Sun-Data-Type: text
X-Sun-Data-Description: text
X-Sun-Data-Name: text
X-Sun-Charset: us-ascii
X-Sun-Content-Lines: 1

Good luck here is three attachments, one for each state table.
----------
X-Sun-Data-Type: default
X-Sun-Data-Description: default
X-Sun-Data-Name: WacsMobileMobileState.excel.tbl
X-Sun-Charset: us-ascii
X-Sun-Content-Lines: 255

This is the Mobile to Mobile State/Event Table for WACS I.  Version number: 1.36

```
#       start state         event                    next state
action(s)
#       -----------         -----         -----------
----------
# Counter31 is number of call attempts
#-----------------------------------------------
#       Call Setup...
#-----------------------------------------------
        idle                ORIGINATE                validating
        (Counter:30 Validate)

# -- Authorization Phase...
        validating          VALID_MOBILE             LookUpCallingCk
        (SendAccept BeginBilling LookUpCircuit)
        validating          INVALID_MOBILE           idle
        (SendDeny Counter:31 CallCleanUp)

# -- Circuit Validation...
        LookUpCallingCk     LOOKUP_CIRCUIT_SUCCESS   waitOutSiezeStatus
        (ExLocalSeize)
        LookUpCallingCk     LOOKUP_CIRCUIT_FAIL      waitRelResNoTermMb
        (SendRelReq:1 Teardown Counter:43)
```

JUN-10-1996  10:45           14076671101                                 P.04

```
# -- Switch Connection...
        waitOutSiezeStatus    OUT_SEIZE_SUCCESS       lookingUpLib
(LookUpLib:1)
        lookingUpLib          LOOKUP_LIB_SUCCESS      checkingMobile
(CheckMobileBusy:1)
        lookingUpLib          LOOKUP_LIB_FAIL         waitDivert2Busy
(ExConnectReOrderPattern)
        checkingMobile        MOBILE_IDLE             waitDivert2RingBack
(ExConnectRingBackPattern)
        checkingMobile        MOBILE_BUSY             waitDivert2Busy
        (ExConnectBusyPattern Counter:33)
        waitDivert2RingBack   CONNECT_TONE_SUCCESS    paging
(PageRequest Counter:32)

# -- Paging Mobile...
        paging                PAGE_RESP_SUCCESS       waitConverse
(Counter:34)

# -- Diverting Call But Receive Converse
        waitConverse          CONVERSE_SUCCESS        waitToneDisconnect
(ExDisConnectTonePattern)
        waitToneDisconnect    DISCONNECT_TONE_SUCCESS waitConnectStatus    (ExConnect)

# -- Connect the Call together...
        waitConnectStatus     CONNECT_SUCCESS         speech
(Speech Counter:35)

#***********************************************
#       RELEASE CASES------
#***********************************************
#-------------------------------------------------
#       Mobile Release...Normal Originating Mobile
#-------------------------------------------------
        speech                MOBILE_ORIG_RELEASE     owaitRel2ChnlStatus
(Teardown ExReleaseChannel)

#-------------------------------------------------
#       Mobile Release...Normal Originating Mobile
#-------------------------------------------------
        speech                MOBILE_TERM_RELEASE     twaitRel2ChnlStatus
(Teardown ExReleaseChannel)

#-------------------------------------------------
#       Mobile Release...Authorization
#-------------------------------------------------
```

```
        validating          MOBILE_ORIG_RELEASE          idle
(SendRelConf:1 Counter:36 EndBilling CallCleanUp)

#---------------------------------------------------------------
#       Mobile Release...Validation
#---------------------------------------------------------------
        LookUpCallingCk     MOBILE_ORIG_RELEASE          idle
(SendRelConf:1 Counter:36 EndBilling CallCleanUp)

#---------------------------------------------------------------
#       Mobile Release...Once mobile has been denied
#---------------------------------------------------------------
        denying             MOBILE_ORIG_RELEASE          idle
(SendRelConf:1 Counter:36 EndBilling CallCleanUp)

#---------------------------------------------------------------
#       Mobile Release...While checking if called mobile busy
#---------------------------------------------------------------
        checkingMobile      MOBILE_ORIG_RELEASE
waitRel1ChnlStatNoTermMb (Teardown ExReleaseChannel)

#---------------------------------------------------------------
#       Mobile Release...While waiting Divert to RingBack
#---------------------------------------------------------------
        waitDivert2RingBack MOBILE_ORIG_RELEASE          waitRel1ChnlStatNoTermMb
(Teardown ExReleaseChannel)

#---------------------------------------------------------------
#       Mobile Release...While waiting Divert to RingBack
#---------------------------------------------------------------
        waitDivert2Busy     CONNECT_TONE_SUCCESS         waitMbRelToneSrc
(NoOp)
        waitDivert2Busy     MOBILE_ORIG_RELEASE
waitRel1ChnlStatNoTermMb (Teardown ExReleaseChannel)
        waitMbRelToneSrc    MOBILE_ORIG_RELEASE          waitRel1ChnlStatNoTermMb
(Teardown ExReleaseChannel)

#---------------------------------------------------------------
#       Terminating Mobile Converse Fail...Waiting Converse
#---------------------------------------------------------------
        waitConverse        MOBILE_TERM_RELEASE          waitRelResTermMb
(Teardown SendRelReq:1)

#---------------------------------------------------------------
#       Mobile Release...paging
#---------------------------------------------------------------
```

| | | |
|---|---|---|
| paging | MOBILE_ORIG_RELEASE | waitPgRespChnlRel |
| (Teardown) | | |
| waitPgRespChnlRel | PAGE_RESP_SUCCESS | waitRelMbChnlRel |
| (SendRelReq:2) | | |
| waitPgRespChnlRel | PAGE_FAIL_NOTFOUND | waitRel1ChnlStatNoTermMb |
| (ExReleaseChannel) | | |
| waitPgRespChnlRel | PAGE_FAIL_CKTBUSY | waitRel1ChnlStatNoTermMb |
| (ExReleaseChannel) | | |

```
----------------------------------------------------------------
#     Orig Mobile Release...Waiting Converse
# ----------------------------------------------------------------
```

| | | |
|---|---|---|
| waitConverse | MOBILE_ORIG_RELEASE | waitRelMbChnlRel |
| (Teardown SendRelReq:2) | | |
| waitRelMbChnlRel | RELEASE_RESPONSE | waitRel1ChnlStatNoTermMb |
| (ExReleaseChannel) | | |

```
----------------------------------------------------------------
#     Orig Mobile Release...Waiting Out Seize Result
# ----------------------------------------------------------------
```

| | | |
|---|---|---|
| waitOutSiezeStatus | MOBILE_ORIG_RELEASE | waitOutSiezeNoCnct |
| (Teardown) | | |
| waitOutSiezeNoCnct | OUT_SEIZE_SUCCESS | owaitRel1ChnlStatus |
| (ExReleaseChannel) | | |
| waitOutSiezeNoCnct | OUT_SEIZE_FAIL | idle |
| (SendRelConf:1 EndBilling CallCleanUp) | | |

```
----------------------------------------------------------------
#     Orig Mobile Release...Waiting Connection Status
# ----------------------------------------------------------------
```

| | | |
|---|---|---|
| waitConnectStatus | MOBILE_ORIG_RELEASE | owaitCnctMbRel |
| (Teardown) | | |
| owaitCnctMbRel | CONNECT_SUCCESS | owaitRel2ChnlStatus |
| (ExReleaseChannel) | | |
| owaitCnctMbRel | CONNECT_FAIL | owaitRel1ChnlStatus |
| (ExReleaseChannel) | | |

```
----------------------------------------------------------------
#     Term Mobile Release...Waiting Connection Status
# ----------------------------------------------------------------
```

| | | |
|---|---|---|
| waitConnectStatus | MOBILE_TERM_RELEASE | twaitCnctMbRel |
| (Teardown) | | |
| twaitCnctMbRel | CONNECT_SUCCESS | twaitRel2ChnlStatus |
| (ExReleaseChannel) | | |
| twaitCnctMbRel | CONNECT_FAIL | twaitRel1ChnlStatus |
| (ExReleaseChannel) | | |

```
----------------------------------------------------------------
#       Mobile Release...RACE Condition releasing mobile but mobile already released
#----------------------------------------------------------------
        oreleasingMobile     MOBILE_TERM_RELEASE         idle
(SendRelConf:1 EndBilling CallCleanUp)
        treleasingMobile     MOBILE_ORIG_RELEASE         idle
(SendRelConf:2 EndBilling CallCleanUp)

#----------------------------------------------------------------
#       Mobile Release...While disconnecting the tone
#----------------------------------------------------------------
        waitToneDisconnect   MOBILE_ORIG_RELEASE         waitRelMbChnlRel
(Teardown SendRelReq:2)
        waitToneDisconnect   MOBILE_TERM_RELEASE         waitRelResTermMb
(Teardown SendRelReq:1)

#****************************************************************
#       FAILURE CASES------
#****************************************************************
#----------------------------------------------------------------
#       Mobile Authorization Fail...
#----------------------------------------------------------------
        denying                     ORIGINATE_FAIL              idle
                (EndBilling CallCleanUp)

----------------------------------------------------------------
#       Mobile Originate Fail during Authorization...
#----------------------------------------------------------------
        validating                  ORIGINATE_FAIL              idle
        (EndBilling Counter:37 CallCleanUp)

#----------------------------------------------------------------
#       Terminating Mobile Converse Fail...Waiting Converse
#----------------------------------------------------------------
        waitConverse         CONVERSE_FAIL               waitRelResTermMb
(Teardown SendRelReq:1)

#----------------------------------------------------------------
#       Divert to RingBack Fail
#----------------------------------------------------------------
        waitDivert2RingBack  CONNECT_TONE_FAIL waitRelResNoTermMbChnl
(Teardown SendRelReq:1)

#----------------------------------------------------------------
#       Divert to Busy Fail
```

```
# - - - - - - - - - - - - - - - - - - - - - - - - - - - - - - - - - - - - - - - - - - - - - - - - - - -
        waitDivert2Busy             CONNECT_TONE_FAIL waitRelResNoTermMbChnl
(Teardown SendRelReq:1)

# - - - - - - - - - - - - - - - - - - - - - - - - - - - - - - - - - - - - - - - - - - - - - - - - - - -
#       Switch Fail during Out Seize of Trunk...
# - - - - - - - - - - - - - - - - - - - - - - - - - - - - - - - - - - - - - - - - - - - - - - - - - - -
        waitOutSiezeStatus    OUT_SEIZE_FAIL        waitRelResNoTermMb
(Teardown SendRelReq:1)

# - - - - - - - - - - - - - - - - - - - - - - - - - - - - - - - - - - - - - - - - - - - - - - - - - - -
#       Switch Fail during Connect...
# - - - - - - - - - - - - - - - - - - - - - - - - - - - - - - - - - - - - - - - - - - - - - - - - - - -
        waitConnectStatus       CONNECT_FAIL
waitRelChnlStatCnctFail   (Teardown ExReleaseChannel)
        waitRelChnlStatCnctFail RELEASE_CHANNEL_SUCCESS waitChnlRelCnctFail   (NoOp)
        waitChnlRelCnctFail   CHANNEL_RELEASED            waitMbRelBoth
            (SendRelReq:1 SendRelReq:2)
        waitMbRelBoth            RELEASE_RESPONSE           waitMbRelResFinal
            (NoOp)
        waitMbRelResFinal      RELEASE_RESPONSE         idle
            (EndBilling CallCleanUp)

waitRelChnlStatCnctFail RELEASE_CHANNEL_FAIL  waitMbRelBoth
        (SendRelReq:1 SendRelReq:2)

# * * * * * * * * * * * * * * * * * * * * * * * * * * * * * * * * * * * * * * * *
#       Page Fail Cases...
# * * * * * * * * * * * * * * * * * * * * * * * * * * * * * * * * * * * * * * * *
        paging                    PAGE_FAIL_NOTFOUND
waitToneDisconnectPgFail    (Counter:38 ExDisConnectTonePattern)
        paging                    PAGE_FAIL_CKTBUSY
waitToneDisconnectPgFail    (Counter:39 ExDisConnectTonePattern)
        waitToneDisconnectPgFail DISCONNECT_TONE_SUCCESS waitRecAnnCnctStatus
(ExRecAnnounceConnect)
        waitRecAnnCnctStatus REC_ANCE_CNCT_SUCCESS    waitRecAnnStatus
(NoOp)
        waitRecAnnStatus          REC_ANCE_COMPLETE
waitRelChnlStatNoTermMb    (Teardown ExReleaseChannel)
        waitToneDisconnectPgFail MOBILE_ORIG_RELEASE   waitRel1ChnlStatNoTermMb
(Teardown ExReleaseChannel)
        waitRecAnnCnctStatus MOBILE_ORIG_RELEASE       waitRel1ChnlStatNoTermMb
(Teardown ExReleaseChannel)
        waitRecAnnStatus          MOBILE_ORIG_RELEASE     waitRel1ChnlStatNoTermMb
(Teardown ExReleaseChannel)
        waitRelChnlStatNoTermMb    RELEASE_CHANNEL_SUCCESS waitRelChnlNoTermMb
```

```
            (NoOp)
        waitRelChnlNoTermMb        CHANNEL_RELEASED
waitRelResNoTermMb                 (SendRelReq:1)

waitRecAnnCnctStatus  REC_ANCE_CNCT_FAIL         waitRelChnlStatNoTermMb
(Teardown ExReleaseChannel)
        waitRelChnlStatNoTermMb    RELEASE_CHANNEL_FAIL  waitRelResNoTermMb
            (SendRelReq:1)

#*************************************************************
#       CLEANUP CONVERGENCE-------
#*************************************************************
#---------------------------------------------------------------
#       ********* Orig Mobile Release Cleanup Final Phase...
#---------------------------------------------------------------
        owaitRel2ChnlStatus   RELEASE_CHANNEL_SUCCESS    owaitChnlRel
        (NoOp)
        owaitChnlRel          CHANNEL_RELEASED           owaitChnlRelCmplt
(NoOp)
        owaitChnlRelCmplt     CHANNEL_RELEASED           oreleasingMobile
            (SendRelReq:2 Counter:36)
        owaitRel2ChnlStatus   RELEASE_CHANNEL_FAIL       oreleasingMobile
(SendRelReq:2 Counter:36)

#---------------------------------------------------------------
#       ********* Term Mobile Release Cleanup Final Phase...
#---------------------------------------------------------------
        twaitRel2ChnlStatus   RELEASE_CHANNEL_SUCCESS    twaitChnlRel
        (NoOp)
        twaitChnlRel          CHANNEL_RELEASED           twaitChnlRelCmplt
(NoOp)
        twaitChnlRelCmplt     CHANNEL_RELEASED           treleasingMobile
            (SendRelReq:1 Counter:36)
        twaitRel2ChnlStatus   RELEASE_CHANNEL_FAIL       treleasingMobile
            (SendRelReq:1 Counter:36)

#---------------------------------------------------------------
#       ********* Mobile Release Cleanup Final Phase...
#---------------------------------------------------------------
        oreleasingMobile      RELEASE_RESPONSE           idle
            (SendRelConf:1 EndBilling CallCleanUp)
        treleasingMobile      RELEASE_RESPONSE           idle
            (SendRelConf:2 EndBilling CallCleanUp)

#---------------------------------------------------------------
#       ********* Orig Mobile Release Out Seize Complete...
```

```
----------------------------------------------------------------
        waitRel1ChnlStatNoTermMb RELEASE_CHANNEL_SUCCESS waitChnlRelCmpltNoTermMb
(NoOp)
        waitChnlRelCmpltNoTermMb CHANNEL_RELEASED           idle
            (SendRelConf:1 EndBilling CallCleanUp)
        waitRel1ChnlStatNoTermMb RELEASE_CHANNEL_FAIL       idle
            (SendRelConf:1 EndBilling CallCleanUp)

#----------------------------------------------------------------
#    ********* Orig Mobile Error Release Channel...
#----------------------------------------------------------------
        owaitRel1ChnlStatNoTermMb RELEASE_CHANNEL_SUCCESS
owaitChnlRelCmpltNoTermMb        (NoOp)
        owaitChnlRelCmpltNoTermMb CHANNEL_RELEASED          idle
            (EndBilling CallCleanUp)
        owaitRel1ChnlStatNoTermMb RELEASE_CHANNEL_FAIL      idle
            (EndBilling CallCleanUp)

----------------------------------------------------------------
#    ********* Term Mobile Converse Fail Complete...
#----------------------------------------------------------------
        twaitRel1ChnlStatNoTermMb RELEASE_CHANNEL_SUCCESS
twaitChnlRelCmpltNoTermMb        (NoOp)
        twaitChnlRelCmpltNoTermMb CHANNEL_RELEASED          idle
            (SendRelConf:2 EndBilling CallCleanUp)
        twaitRel1ChnlStatNoTermMb RELEASE_CHANNEL_FAIL      idle
            (SendRelConf:2 EndBilling CallCleanUp)

#----------------------------------------------------------------
********* Switch Release Cleanup Not Connected Final Phase...
#----------------------------------------------------------------
        owaitRel1ChnlStatus   RELEASE_CHANNEL_SUCCESS       owaitChnlRelCmplt
(NoOp)
        twaitRel1ChnlStatus   RELEASE_CHANNEL_SUCCESS       twaitChnlRelCmplt
(NoOp)

owaitRel1ChnlStatus   RELEASE_CHANNEL_FAIL          idle
(SendRelConf:1 EndBilling CallCleanUp)
        twaitRel1ChnlStatus   RELEASE_CHANNEL_FAIL          idle
(SendRelConf:1 EndBilling CallCleanUp)

#----------------------------------------------------------------
#    ********* Mobile Release Request No Terminating Mobile Final Phase...
#----------------------------------------------------------------
        waitRelResTermMb              RELEASE_RESPONSE
twaitRel1ChnlStatNoTermMb (ExReleaseChannel)
```

```
        waitRelResNoTermMbChnl      RELEASE_RESPONSE
owaitRel1ChnlStatNoTermMb (ExReleaseChannel)
        waitRelResNoTermMb          RELEASE_RESPONSE         idle
            (EndBilling CallCleanUp)
- - - - - - - - - - -
X-Sun-Data-Type: default
X-Sun-Data-Description: default
X-Sun-Data-Name: WacsMobileTrkState.excel.tbl
X-Sun-Charset: us-ascii
X-Sun-Content-Lines: 155

This is the Mobile to Trunk State/Event Table for WACS I. Version number: 1.36 start state         event                   next state
action(s)
#       - - - - - - - - -   - - - - -               - - - - - - - - -
- - - - - - - - - -
# Counter16 is number of call attempts
# - - - - - - - - - - - - - - - - - - - - - - - - - - - - - - - - - -
#       Call Setup...
# - - - - - - - - - - - - - - - - - - - - - - - - - - - - - - - - - -
        idle                ORIGINATE               validating
            (Counter:15 Validate)

# -- Authorization Phase...
        validating          VALID_MOBILE            LookUpCallingCk
            (SendAccept BeginBilling LookUpCircuit)
        validating          INVALID_MOBILE          idle
            (SendDeny Counter:16 CallCleanUp)

# -- Circuit Validation...
        LookUpCallingCk     LOOKUP_CIRCUIT_SUCCESS  waitLocalSeizeStatus
(ExLocalSeize)
        LookUpCallingCk     LOOKUP_CIRCUIT_FAIL     releasingMobile
            (SendRelReq:1 Counter:28)

# -- Switch Connection...
        waitLocalSeizeStatus OUT_SEIZE_SUCCESS waitOutSiezeStatus   (ExOutSeize)
        waitLocalSeizeStatus OUT_SEIZE_FAIL         releasingMobile
(SendRelReq:1 Counter:28)

waitOutSiezeStatus  OUT_SEIZE_SUCCESS       waitCallProcEvent   (NoOp)
        waitCallProcEvent   SUBSCRIBER_FREE         waitConnectStatus
(ExConnect Counter:18)
        waitConnectStatus   CONNECT_SUCCESS         waitAnswer
(Counter:24)
```

```
        waitAnswer           ANSWERED              speech
(Speech)

#••••••••••••••••••••••••••••••••••••••••••••••••••••••••
#       RELEASE CASES-------
#••••••••••••••••••••••••••••••••••••••••••••••••••••••••
#----------------------------------------------------------------
#       Mobile Release...Normal
#----------------------------------------------------------------
        speech                MOBILE_ORIG_RELEASE    waitRel2ChnlStatus
(Teardown ExReleaseChannel)
        waitAnswer            MOBILE_ORIG_RELEASE    waitRel2ChnlStatus
(Teardown ExReleaseChannel)

----------------------------------------------------------------
#       Mobile Release...Authorization
#----------------------------------------------------------------
        validating            MOBILE_ORIG_RELEASE    idle
(SendRelConf:1 Counter:23 EndBilling CallCleanUp)

#----------------------------------------------------------------
#       Mobile Release...Validation
#----------------------------------------------------------------
        LookUpCallingCk       MOBILE_ORIG_RELEASE    idle
(SendRelConf:1 Counter:23 EndBilling CallCleanUp)

#----------------------------------------------------------------
#       Mobile Release...Once mobile has been denied
#----------------------------------------------------------------
        denying               MOBILE_ORIG_RELEASE            idle
           (SendRelConf:1 Counter:23 EndBilling CallCleanUp)

#----------------------------------------------------------------
#       Mobile Release...Waiting Out Seize Result
#----------------------------------------------------------------
        waitLocalSeizeStatus  MOBILE_ORIG_RELEASE    waitOutSiezeNoCnct  (Teardown)
        waitOutSiezeStatus    MOBILE_ORIG_RELEASE    waitOutSiezeNoCnct
(Teardown)
        waitOutSiezeNoCnct    OUT_SEIZE_SUCCESS      waitRel1ChnlStatus
(ExReleaseChannel)
        waitOutSiezeNoCnct    OUT_SEIZE_FAIL         idle
(SendRelConf:1 EndBilling CallCleanUp)

#----------------------------------------------------------------
#       Mobile Release...Waiting Connection Status
#----------------------------------------------------------------
```

```
            waitConnectStatus   MOBILE_ORIG_RELEASE      waitCnctMbRel
(Teardown)
            waitCnctMbRel       CONNECT_SUCCESS          waitRel2ChnlStatus
(ExReleaseChannel)
            waitCnctMbRel       CONNECT_FAIL             waitRel1ChnlStatus
(ExReleaseChannel)

#----------------------------------------------------------------------
#     Mobile Release...RACE Condition releasing mobile but mobile already released
#----------------------------------------------------------------------
            releasingMobile     MOBILE_ORIG_RELEASE      idle
            (EndBilling CallCleanUp)

#----------------------------------------------------------------------
#     Trunk Release...Normal
#----------------------------------------------------------------------
            speech              CHANNEL_RELEASED         waitChnlRelCmpltMb
(Teardown)
            waitChnlRelCmpltMb  MOBILE_ORIG_RELEASE      waitChnlRelCmplt    (NoOp)
            waitChnlRelCmpltMb  CHANNEL_RELEASED         releasingMobile
(SendRelReq:1)

#**********************************************************************
#     FAILURE CASES-------
#**********************************************************************
#----------------------------------------------------------------------
#     Mobile Authorization Fail...
#----------------------------------------------------------------------
            denying             ORIGINATE_FAIL           idle
                (EndBilling CallCleanUp)

#----------------------------------------------------------------------
#     Mobile Originate Fail during Authorization...
#----------------------------------------------------------------------
            validating          ORIGINATE_FAIL           idle
            (EndBilling Counter:17 CallCleanUp)

#----------------------------------------------------------------------
#     Switch Fail during Connect...
#----------------------------------------------------------------------
            waitOutSiezeStatus  OUT_SEIZE_FAIL           releasingMobile
            (Teardown SendRelReq:1)

#----------------------------------------------------------------------
#     Switch Fail during Connect...
#----------------------------------------------------------------------
```

```
        waitConnectStatus        CONNECT_FAIL
waitRelChnlStatCnctFail          (Teardown ExReleaseChannel)
        waitRelChnlStatCnctFail  RELEASE_CHANNEL_SUCCESS  waitChnlRelCnctFail    (NoOp)
        waitChnlRelCnctFail      CHANNEL_RELEASED                                releasingMobile
        (SendRelReq:1)
```

----------------------------------------------------------------------
Switch Generate Busy Event
----------------------------------------------------------------------

```
        waitCallProcEvent   SUBSCRIBER_BUSY              waitDivert2Busy
        (ExConnectBusyPattern)
        waitDivert2Busy     CHANNEL_RELEASED             idle
        (EndBilling CallCleanUp)
        waitDivert2Busy     CONNECT_TONE_SUCCESS         waitMbRelToneSrc
(NoOp)
        waitDivert2Busy     CONNECT_TONE_FAIL            idle
        (EndBilling CallCleanUp)
        waitCallProcEvent   MOBILE_ORIG_RELEASE          waitRel2ChnlStatus
(Teardown ExReleaseSepChannel)
        waitMbRelToneSrc    MOBILE_ORIG_RELEASE          waitRel2ChnlStatus
(Teardown ExReleaseSepChannel)
        waitDivert2Busy     MOBILE_ORIG_RELEASE
waitRel2ChnlStatus (Teardown ExReleaseSepChannel)
```

----------------------------------------------------------------------
Switch Generate Network Congestion Event
----------------------------------------------------------------------

```
        waitCallProcEvent    NETWORK_CONGESTION          waitDivert2Reorder
(ExConnectReOrderPattern)
        waitDivert2Reorder   CHANNEL_RELEASED            idle
(CallCleanUp)
        waitDivert2Reorder   CONNECT_TONE_SUCCESS        waitMbRelToneSrc    (NoOp)
        waitDivert2Reorder   CONNECT_TONE_FAIL           idle
(EndBilling CallCleanUp)
        waitDivert2Reorder   MOBILE_ORIG_RELEASE         waitRel2ChnlStatus
(Teardown ExReleaseSepChannel)
```

······································································
CLEANUP CONVERGENCE------
······································································
----------------------------------------------------------------------
********* Trunk Side Mobile Release Cleanup Final Phase...
----------------------------------------------------------------------

```
        waitRel2ChnlStatus       RELEASE_CHANNEL_SUCCESS      waitChnlRel
                (NoOp)
        waitChnlRel              CHANNEL_RELEASED
```

```
    waitChnlRelCmplt          (NoOp)
        waitChnlRelCmplt          CHANNEL_RELEASED                    idle
            (SendRelConf:1 Counter:23 EndBilling CallCleanUp)
        waitRel2ChnlStatus        CHANNEL_RELEASED                    idle
            (SendRelConf:1 Counter:23 EndBilling CallCleanUp)
        waitRel2ChnlStatus        RELEASE_CHANNEL_FAIL                idle
            (SendRelConf:1 Counter:23 EndBilling CallCleanUp)
        waitChnlRel                      RELEASE_CHANNEL_FAIL          idle
            (SendRelConf:1 Counter:23 EndBilling CallCleanUp)
        waitChnlRelCmplt          RELEASE_CHANNEL_FAIL                idle
            (SendRelConf:1 Counter:23 EndBilling CallCleanUp)

#----------------------------------------------------------------------
#         ********* Mobile Release Cleanup Final Phase...
#----------------------------------------------------------------------
        releasingMobile           CHANNEL_RELEASED
releasingMobile          (NoOp)
        releasingMobile           RELEASE_RESPONSE                    idle
            (EndBilling CallCleanUp)

#----------------------------------------------------------------------
#         ********* Switch Release Cleanup Not Connected Final Phase...
#----------------------------------------------------------------------
        waitRel1ChnlStatus        RELEASE_CHANNEL_SUCCESS
waitChnlRelCmplt     (NoOp)
        waitRel1ChnlStatus        RELEASE_CHANNEL_FAIL                idle
            (EndBilling CallCleanUp)

#----------------------------------------------------------------------
#         ********* Orig Mobile Release Out Seize Complete...
#----------------------------------------------------------------------
        waitRel1ChnlStatNoTermMb RELEASE_CHANNEL_SUCCESS waitChnlRelCmpltNoTermMb
(NoOp)
        waitChnlRelCmpltNoTermMb CHANNEL_RELEASED                     idle
            (SendRelConf:1 EndBilling CallCleanUp)
        waitRel1ChnlStatNoTermMb RELEASE_CHANNEL_FAIL                 idle
            (SendRelConf:1 EndBilling CallCleanUp)
- - - - - - - - - -
X-Sun-Data-Type: default
X-Sun-Data-Description: default
X-Sun-Data-Name: WacsState.excel.tbl
X-Sun-Charset: us-ascii
X-Sun-Content-Lines: 228

# This is the Trunk to Mobile State Table for WACS I.  Version number: 1.27
# Counter1 is number of Trunk to Mobile call attempts
```

```
#       start state                 event                       next state
                action(s)
#       ...........                 .....
..........                          .........
#-------------------------------------------------------------------------------
#       Call Setup...
#-------------------------------------------------------------------------------
        idle                        INCOMING_CALL               lookingUpLib
                (Counter:0 LookUpLib)

# -- Authorization Phase...
        lookingUpLib                LOOKUP_LIB_SUCCESS          checkingMobile
                (CheckMobileBusy)

# -- Mobile Status Check...
        checkingMobile              MOBILE_BUSY
waitDivert2Busy                     (ExConnectBusyPattern Counter:6)
        checkingMobile              MOBILE_IDLE
waitCallProcEventStatus     (ExGenCallProcEvent:34)
        waitCallProcEventStatus     GEN_CALLPROC_EV_SUCCESS     waitDivert2RingBack
                (ExConnectRingBackPattern)
        waitDivert2RingBack         CONNECT_TONE_SUCCESS        paging
                (PageRequest Counter:8)

# -- Paging Mobile...
        paging                      PAGE_RESP_SUCCESS           waitConverse
                (BeginBilling)

# -- Diverting Call But Receive Converse
        waitConverse                CONVERSE_SUCCESS            waitToneDisconnect
(ExDisConnectTonePattern)
        waitToneDisconnect          DISCONNECT_TONE_SUCCESS waitConnectStatus
(ExConnect)

# -- Connect the Call together...
        waitConnectStatus           CONNECT_SUCCESS             speech
                (Speech Counter:9)

#**********************************************************
#       RELEASE CASES-------
#**********************************************************
#-------------------------------------------------------------------------------
#       Mobile Release...Normal
#-------------------------------------------------------------------------------
        speech                      MOBILE_TERM_RELEASE
```

```
waitRel2ChnlStatus        (Teardown ExReleaseChannel)

# ----------------------------------------------------------------
#       Mobile Release...While Waiting for Connect
# ----------------------------------------------------------------
        waitConnectStatus       MOBILE_TERM_RELEASE     waitCnctMbRel
            (Teardown)
        waitCnctMbRel                   CONNECT_SUCCESS
waitRel2ChnlStatus      (ExReleaseChannel)
        waitCnctMbRel                   CONNECT_FAIL
waitRel1ChnlStatus      (ExReleaseChannel)

# ----------------------------------------------------------------
#       Mobile Release...While Waiting Tone Disconnect
# ----------------------------------------------------------------
        waitToneDisconnect      MOBILE_TERM_RELEASE
waitToneDisconnectMbRel (Teardown)
        waitToneDisconnectMbRel  DISCONNECT_TONE_SUCCESS waitRel1ChnlStatus
(ExReleaseChannel)
        waitToneDisconnectMbRel  DISCONNECT_TONE_FAIL   waitRel1ChnlStatus
(ExReleaseChannel)

# ----------------------------------------------------------------
#       Mobile Release...While Releasing
# ----------------------------------------------------------------
        releasingMobile         MOBILE_TERM_RELEASE     idle
            (EndBilling CallCleanUp)

----------------------------------------------------------------
#       Fail...
# ----------------------------------------------------------------
        waitConverse            MOBILE_TERM_RELEASE     waitChnlRelNoMobile
(Teardown ExReleaseChannel)

----------------------------------------------------------------
#       Trunk Release...Normal
# ----------------------------------------------------------------
        speech                  CHANNEL_RELEASED        waitChnlRelCmpltMb
(Teardown)
        waitChnlRelCmpltMb MOBILE_TERM_RELEASE  waitChnlRelCmplt  (NoOp)
        waitChnlRelCmpltMb CHANNEL_RELEASED     releasingMobile
(SendRelReq:2)

# ----------------------------------------------------------------
#       Trunk Release...Checking the Trunk Library
# ----------------------------------------------------------------
```

```
        lookingUpLib        CHANNEL_RELEASED            idle
(CallCleanUp)

#------------------------------------------------------------------
#       Trunk Release...While Diverting Call Because of Busy Mobile
#------------------------------------------------------------------
        waitDivert2Busy     CHANNEL_RELEASED            idle
(CallCleanUp)

#------------------------------------------------------------------
#       Trunk Release...While Paging Mobile
#------------------------------------------------------------------
        paging              CHANNEL_RELEASED            waitPgRespChnlRel
(Teardown)
        waitPgRespChnlRel   PAGE_RESP_SUCCESS           releasingMobile
(SendRelReq:2)
        waitPgRespChnlRel   PAGE_FAIL_NOTFOUND          idle
(Counter:4 CallCleanUp)
        waitPgRespChnlRel   PAGE_FAIL_CKTBUSY           idle
(Counter:10 CallCleanUp)

#------------------------------------------------------------------
#       Trunk Release...While Paging Mobile
#------------------------------------------------------------------
        waitConverse        CHANNEL_RELEASED            releasingMobile
(Teardown SendRelReq:2)

#------------------------------------------------------------------
#       Trunk Release...While Waiting for Connection
#------------------------------------------------------------------
        waitConnectStatus   CHANNEL_RELEASED            releasingMobile
(Teardown SendRelReq:2)

#------------------------------------------------------------------
#       Trunk Release...RACE Condition Trunk and Mobile Release
#------------------------------------------------------------------
        waitCnctMbRel       CHANNEL_RELEASED            idle
(SendRelConf:2 EndBilling CallCleanUp)

#------------------------------------------------------------------
#       Trunk Release...RACE Condition Trunk and Mobile Release
#------------------------------------------------------------------
        waitToneDisconnectMbRel  CHANNEL_RELEASED       idle
(SendRelConf:2 EndBilling CallCleanUp)

#------------------------------------------------------------------
```

```
#       Trunk Release...Disconnecting Tone
# -----------------------------------------------------------------
        waitToneDisconnectPgFail    CHANNEL_RELEASED    idle    (CallCleanUp)

# -----------------------------------------------------------------
#       Trunk Release...Recorded Announce Connect
# -----------------------------------------------------------------
        waitRecAnnCnctStatus        CHANNEL_RELEASED    idle    (CallCleanUp)

# -----------------------------------------------------------------
#       Trunk Release...Recorded Connect Status
# -----------------------------------------------------------------
        waitRecAnnStatus            CHANNEL_RELEASED    idle
(CallCleanUp)

# -----------------------------------------------------------------
#       Trunk Release...Recorded Connect Status
# -----------------------------------------------------------------
        waitToneDisconnect          CHANNEL_RELEASED    releasingMobile
(Teardown SendRelReq:2)

# *****************************************************************
#       BUSY  CASES-------
# *****************************************************************
# -----------------------------------------------------------------
#       Busy Mobile...
# -----------------------------------------------------------------
        waitDivert2Busy             CONNECT_TONE_SUCCESS
waitChnlRelNoMobileCmplt (NoOp)

# *****************************************************************
#       FAILURE  CASES-------
# *****************************************************************

# *****************************************************************
#       Page Fail Cases...
# *****************************************************************
        paging                      PAGE_FAIL_NOTFOUND
waitToneDisconnectPgFail (Counter:4 ExDisConnectTonePattern)
        paging                      PAGE_FAIL_CKTBUSY
waitToneDisconnectPgFail (Counter:10 ExDisConnectTonePattern)
        waitToneDisconnectPgFail    DISCONNECT_TONE_SUCCESS waitRecAnnCnctStatus
(ExRecAnnounceConnect)
        waitRecAnnCnctStatus        REC_ANCE_CNCT_SUCCESS   waitRecAnnStatus
(NoOp)
        waitRecAnnStatus            REC_ANCE_COMPLETE
```

```
    waitChnlRelNoMobile        (Teardown ExReleaseChannel)
        waitToneDisconnectPgFail    CHANNEL_RELEASED        idle
            (CallCleanUp)
        waitRecAnnCnctStatus        CHANNEL_RELEASED        idle
            (CallCleanUp)
        waitRecAnnStatus                    CHANNEL_RELEASED        idle
            (CallCleanUp)

#***********************************************************
#    Divert to Busy Fail
#***********************************************************
        waitDivert2Busy                 CONNECT_TONE_FAIL        idle
            (CallCleanUp)

#-----------------------------------------------------------
#    Subscriber Lookup Fail...
#-----------------------------------------------------------
        lookingUpLib                    LOOKUP_LIB_FAIL        waitDivert2Busy
            (Teardown Counter:1 ExConnectReOrderPattern)

#-----------------------------------------------------------
#    Fail...
#-----------------------------------------------------------
        waitConverse                    CONVERSE_FAIL            waitChnlRelNoMobile
            (Teardown Counter:7 ExReleaseChannel)

#-----------------------------------------------------------
#    Fail...
#-----------------------------------------------------------
        waitCallProcEventStatus    GEN_CALLPROC_EV_FAIL    waitChnlRelNoMobile
    (Teardown ExReleaseChannel)

#-----------------------------------------------------------
#    Divert to RingBack Fail
#-----------------------------------------------------------
        waitDivert2RingBack         CONNECT_TONE_FAIL        idle
            (Counter:13 CallCleanUp)

#-----------------------------------------------------------
#    Disconnect Tone Fail...
#-----------------------------------------------------------
        waitToneDisconnect            DISCONNECT_TONE_FAIL    waitRel1ChnlStatus
    (Teardown ExReleaseChannel)
```

```
#       Page Fail Disconnect Tone for Recorded Announce...
#-----------------------------------------------------------------------
        waitToneDisconnectPgFail   DISCONNECT_TONE_FAIL   waitRel1ChnlStatus
(Teardown ExReleaseChannel)

#-----------------------------------------------------------------------
#       Page Fail Recorded Announce Connection Fail...
#-----------------------------------------------------------------------
        waitRecAnnCnctStatus    REC_ANCE_CNCT_FAIL    waitRel1ChnlStatus
(Teardown ExReleaseChannel)

#-----------------------------------------------------------------------
#       Call Connection Failed...
#-----------------------------------------------------------------------
        waitConnectStatus       CONNECT_FAIL
waitRel1ChnlStatus              (Teardown ExReleaseChannel)

#***********************************************************
#       CLEANUP CONVERGENCE-------
#***********************************************************
#-----------------------------------------------------------------------
#       ********* Trunk Side Mobile Release Cleanup Final Phase...
#-----------------------------------------------------------------------
        waitRel2ChnlStatus      RELEASE_CHANNEL_SUCCESS       waitChnlRel
            (NoOp)
        waitChnlRel             CHANNEL_RELEASED
waitChnlRelCmplt    (NoOp)
        waitChnlRelCmplt        CHANNEL_RELEASED              idle
        (SendRelConf:2 EndBilling CallCleanUp)
        waitRel2ChnlStatus      CHANNEL_RELEASED              idle
        (SendRelConf:1 Counter:23 EndBilling CallCleanUp)
        waitRel2ChnlStatus      RELEASE_CHANNEL_FAIL          idle
        (SendRelConf:1 Counter:23 EndBilling CallCleanUp)
        waitChnlRel                     RELEASE_CHANNEL_FAIL          idle
            (SendRelConf:1 Counter:23 EndBilling CallCleanUp)
        waitChnlRelCmplt        RELEASE_CHANNEL_FAIL          idle
        (SendRelConf:1 Counter:23 EndBilling CallCleanUp)

#-----------------------------------------------------------------------
#       ********* Trunk Release No Mobile Cleanup Final Phase...
#-----------------------------------------------------------------------
        waitChnlRelNoMobile             RELEASE_CHANNEL_SUCCESS
waitChnlRelNoMobileCmplt  (NoOp)
        waitChnlRelNoMobileCmplt  CHANNEL_RELEASED    idle
            (CallCleanUp)
        waitChnlRelNoMobile             RELEASE_CHANNEL_FAIL    idle
```

```
                    (CallCleanUp)

#----------------------------------------------------------------
#        ********* Mobile Release Cleanup Final Phase...
#----------------------------------------------------------------
         releasingMobile          RELEASE_RESPONSE              idle
              (EndBilling CallCleanUp)

#----
----------------------------------------------------------------
********* Switch Release Cleanup Not Connected Final Phase...
#----------------------------------------------------------------
              waitRel1ChnlStatus    RELEASE_CHANNEL_SUCCESS
waitChnlRelCmplt   (NoOp)
              waitRel1ChnlStatus    RELEASE_CHANNEL_FAIL         idle
              (EndBilling CallCleanUp)
```

As discussed above, there are three object-components to the software applications of the adjunct node-processor 12. The call-processing objects soft-ware listing and the state machine therefor have been shown and described above. The second component, cell-site interface objects applications software, also includes a state table and object-software listing for creating a pointer. However, whereas in the call-processing objects, the state table therefor is separate and distinct from the objects, or pointer, in the cell-site interface objects applications software, the state table therefor is embedded in the actual objects-software listing itself. The following is the software listing of the cell-site interface objects application software with its embedded state table.

```
/*************************************************************
 *******
 * $Source: /src/work/WACS/src/gsLib/RCS/smartradio.C,v $
 * $Date: 1996/06/12 18:38:10 $
 * Description: object encapsulation of Grayson's Smart Radio
 * Author: tsao@pwgi.com

*************************************************************
 *****/ include <share/bss2mccmsg.h> include <gsLib/smartradio.h>
include <gsLib/smartcell.h>
include <gsLib/gsevents.h> include <utlLib/fsm.h>
include <utlLib/action.h>
#include <utlLib/iocallback.h>
#include <utlLib/dispatcher.h>
include <utlLib/list.h> include <ttLib/ttipc.h> include <OTC/debug/tracer.hh>
include <OTC/debug/tracetag.hh>
OTCLIB_STATIC_TRACETAG(RADIO_TRACE);

declareIOCallback(SmartRadio)
implementIOCallback(SmartRadio)

declareActionCallback(SmartRadio)
implementActionCallback(SmartRadio)

static int _dnldTimerInt;
//static int _pktseqno;
//static int sendRetries;
static char* RdoStStr[] = {
        "RdoUnknown",
        "RdoDnldReq",
        "RdoDnlding",
        "RdoDnldOk",
        "RdoDnldFailed",
        "RdoConfiguring",
        "RdoIdle",
        "RdoOriginating",
        "RdoOnChannel",
        "RdoWaitTerm",
        "RdoPaging",
        "RdoPageResped",
        "RdoAlerting",
        "RdoAnswered",
        "RdoRelReq",
        "RdoSpeech",
```

```
        "RdoDown",
        "RdoMissing",
        "RdoDisabled",
        "RdoProblem"
        };

RdoImagePkt::RdoImagePkt(int len, const u_char* pkt)
{
  _len = len;
  _pktp = new u_char[len];
  memcpy(_pktp, pkt, len);
}

RdoImagePkt::~RdoImagePkt() { delete [] _pktp; }

RadioCfg::RadioCfg(
                    u_char type, u_char mode, u_char sat, u_char dcc,
                    u_char pwr, u_char aveprd, u_char diff, u_short chnl
                    )
  : _type(type), _mode(mode), _sat(sat), _dcc(dcc), _chnl(chnl), _pwr(pwr),
      _aveprd(aveprd), _diff(diff)
{}

RadioCfg::RadioCfg() {}

RadioCfg::RadioCfg(const RadioCfg& rc)
{
  _type = rc._type;
  _mode = rc._mode;
  _sat = rc._sat;
  _dcc = rc._dcc;
  _pwr = rc._pwr;
  _aveprd = rc._aveprd;
  _diff = rc._diff;
  _chnl = rc._chnl;
}

RadioCfg& RadioCfg::operator=(const RadioCfg& rc)
{
  _type = rc._type;
  _mode = rc._mode;
  _sat = rc._sat;
  _dcc = rc._dcc;
  _pwr = rc._pwr;
  _aveprd = rc._aveprd;
  _diff = rc._diff;
  _chnl = rc._chnl;
  return *this;
}

SmartRadio::SmartRadio(SmartCell* s, int n, const RadioCfg& rc)
{
  _smcell = s;
  _rid = n;
```

```
_rdocfg = rc;
_callid = 0;
_calltype = 0;
_isLoaded = 0;

init_timer();
init_fsm();
} void SmartRadio::init_timer()
{
//--- dnld timer
_iohdnldTimer = new IOCallback(SmartRadio)(
                                                                    this,
&SmartRadio::dnld_timer
                                                                    );

//--- orig timer
_iohorigTimer = new IOCallback(SmartRadio)(
                                                                    this,
&SmartRadio::orig_timer
                                                                    );
//--- page timer
_iohpageTimer = new IOCallback(SmartRadio)(
                                                                    this,
&SmartRadio::page_timer
                                                                    );
//--- tune2chan timer
_ioht2cTimer = new IOCallback(SmartRadio)(
                                                                    this,
        &SmartRadio::t2c_timer
                                                                    );
//--- alert timer
_iohalertTimer = new IOCallback(SmartRadio)(
                                                                    this,
&SmartRadio::alert_timer
                                                                    );
//--- term timer
_iohtermTimer = new IOCallback(SmartRadio)(
                                                                    this,
&SmartRadio::term_timer
                                                                    );
//--- term timer
_iohcfgTimer = new IOCallback(SmartRadio)(
                                                                    this,
&SmartRadio::cfg_timer
```

52

```
                                                              );
  char* p = getenv("DNLD_TIMER");
  _dnldTimerInt = p ? atoi(p) : defaultDnldTimer;
}

SmartRadio::~SmartRadio()
{
  delete _iohdnldTimer;
  delete _iohorigTimer;
  delete _iohpageTimer;
  delete _ioht2cTimer;
  delete _iohalertTimer;
  delete _iohtermTimer;
  delete _fsm;
} void SmartRadio::init_fsm()
{
  OTCLIB_TRACER(RADIO_TRACE>2) << "Radio: " << _rid << endl;
  OTCLIB_TRACER(RADIO_TRACE>2) << " Initializing the radio......" << endl;
  OTCLIB_TRACER(RADIO_TRACE>2) << " Creating a State Machine......" << endl;
  _fsm = new FSM(RdoUnknown);
  OTCLIB_TRACER(RADIO_TRACE>2) << " Load the state table......" << endl;
  load_statetbl();
} int SmartRadio::get_state() const
{
  return _fsm->get_state();
} int SmartRadio::set_state(RadioState s)
{
  OTCLIB_TRACER(RADIO_TRACE>2) << "State Change, ";
  OTCLIB_TRACER(RADIO_TRACE>2) << "From: " << get_state() << " To: " <<s<<endl;

if (s == RdoIdle){
          clear_radio();
          stop_all_timers();
  }

_smcell->msg2monet_radio_status(_rid, s);

return _fsm->go(s);
} void SmartRadio::clear_radio()
{
  OTCLIB_TRACER(RADIO_TRACE>2) << "SmartRadio::clear_radio()" << endl;
  _calltype = Unknown;
  _callid = 0;
  memset(_min, '\0', 17);
```

```cpp
}

//--- message handlers for messages from SmartCELL
void SmartRadio::cellmsg_handler(int e, const GrsnFrame& f, u_long cid)
{
  OTCLIB_TRACER(RADIO_TRACE>2) << " Radio: " << _rid << endl;
  OTCLIB_TRACER(RADIO_TRACE>2) << " SmartRadio::cellmsg_handler()" << endl;

if (cid > 0) _callid = cid;
  _frm = f;
  _fsm->fire(e);
  _smcell->msg2monet_radio_status(_rid, _fsm->get_state());
} void SmartRadio::mccmsg_handler(int e)
{
  OTCLIB_TRACER(RADIO_TRACE>2) << "Radio: " << _rid << endl;
  OTCLIB_TRACER(RADIO_TRACE>2) << "SmartRadio::mccmsg_handler()" << endl;
  _fsm->fire(e);
  _smcell->msg2monet_radio_status(_rid, _fsm->get_state());
} void SmartRadio::cellmsg_radiostat()
{
  OTCLIB_TRACER(RADIO_TRACE) << "Radio Stat, Radio No: " << _rid;

int s = _frm.get_statbits();
  OTCLIB_TRACER(RADIO_TRACE) << ", Status: " << hex << s << dec <<endl << endl;

int st = get_state();
  if (st == RdoDnlding || st == RdoDisabled ) return;

//u_char txpwr = _frm.get_txpwr();
  //cout << "*** Radio Stat Tx Pwr: " << hex << (int)txpwr << dec << endl << endl;
  //u_char antno = _frm.get_antno();
  //cout << "*** Radio Stat Ant Num: " << hex << (int)antno << dec << endl << endl;

switch (s) {
  case (int)RadioStateOk: {
          if (_rdocfg._type == RdoTypeSetUp) _smcell->cfg_sysheader(_rid);
          if (st != RdoDnlding && !is_rdoincall()) set_state(RdoIdle);
          break;
  }
  case (int)RadioStateCfgReq:
          stop_wait_for_cfg();
          cfg_radio();
          set_state(RdoConfiguring);
          break;
  case (int)RadioStateDnldReq: {
          start_dnld_image();
          set_state(RdoDnlding);
          _smcell->msg2monet_radio_status(_rid, SmartRadio::RdoDnlding);
```

```
              char buf[40];
              ::sprintf(buf, "Start Download Radio: %d", _rid);
              _smcell->msg2monet_text_status(buf);
              ::sprintf(buf, "Radio: %d DownLoad", _rid);
              _smcell->msg2alarm("RadioAlarm", buf);
              break;
       }
       case RadioStateMissing: {
              //if ( !is_rdoincall() ) set_state(RdoMissing);
              char buf[40];
              ::sprintf(buf, "Radio: %d Not Installed", _rid);
              _smcell->msg2alarm("RadioAlarm", buf);
              set_state(RdoMissing);
              break;
       }
       case (int)RadioStateCntrlLock:
              break;
       case (int)RadioStateTxStatus:
              cout << "Radio Stat: Radio Transmitter ON Radio: " << _rid << endl;
              break;
       default: {
              char buf[40];
              ::sprintf(buf, "Radio: %d Problem", _rid);
              _smcell->msg2alarm("RadioAlarm", buf);
              cerr << "Error in radio: " << _rid << endl;
              set_state(RdoProblem);
              break;
       }

}

_smcell->check_rdo_status();

} void SmartRadio::cellmsg_lvlchg()
{
  OTCLIB_TRACER(RADIO_TRACE>2) << "Radio: " << _rid << endl;
  OTCLIB_TRACER(RADIO_TRACE>2) << "SmartRadio::cellmsg_lvlchg()" << endl;
  _rssi = _frm.get_rssi();
  _satind = _frm.get_satind();
  OTCLIB_TRACER(RADIO_TRACE>2) << "RSSI: " << (int)_rssi << endl;
  OTCLIB_TRACER(RADIO_TRACE>2) << "SAT Ind: " << (int)_satind << endl;
  cout << "level change rdo: " << _rid << " rssi: " << (int)_rssi << endl;
} void SmartRadio::cellmsg_measack()
{
  OTCLIB_TRACER(RADIO_TRACE>2) << "Radio: " << _rid << endl;
  OTCLIB_TRACER(RADIO_TRACE>2) << "SmartRadio::cellmsg_measack()" << endl;
  _rssi = _frm.get_rssi();
  _satind = _frm.get_satind();
  OTCLIB_TRACER(RADIO_TRACE>2) << "RSSI: " << (int)_rssi << endl;
  OTCLIB_TRACER(RADIO_TRACE>2) << "SAT Ind: " << (int)_satind << endl;
```

```cpp
  _smcell->msg2monet_measack_data(_rid, (int)_rssi, (int)_satind);
  cout << "measure change rdo: " << _rid << " rssi: " << (int)_rssi << endl;

} void SmartRadio::cellmsg_orig()
{
  OTCLIB_TRACER(RADIO_TRACE) << "Radio: " << _rid;
  OTCLIB_TRACER(RADIO_TRACE) << ", SmartRadio::cellmsg_orig()" << endl;

_calltype = Mb2Trk;
  _callid = _smcell->create_callid();

_frm.get_min(_min);
  _frm.get_esn(_esn);
  _frm.get_dgs(_dgs);
  OTCLIB_TRACER(RADIO_TRACE) << "Call id: " << _callid;
  OTCLIB_TRACER(RADIO_TRACE) << "MIN: " << _min;
  OTCLIB_TRACER(RADIO_TRACE) << ", ESN: " << _esn;
  OTCLIB_TRACER(RADIO_TRACE) << ", Digits: " << _dgs << endl << endl;

// tuning to the channel
  _smcell->msg2bss_tune2chan(_min, _rid);
  // for test only
  _smcell->msg2bss_seize(_rid, _rid);
  start_t2ctimer();
} void SmartRadio::cellmsg_onchan()
{
  OTCLIB_TRACER(RADIO_TRACE) << "Radio: " << _rid;
  OTCLIB_TRACER(RADIO_TRACE) << ",
SmartRadio::cellmsg_onchan()"<<endl<<endl;

stop_t2ctimer();
  // send a call originate now
  // for test only
  _smcell->msg2mcc_orig(_callid, _rid, _min, _esn, _dgs);
  start_origtimer();
} void SmartRadio::cellmsg_pgonchan()
{
  OTCLIB_TRACER(RADIO_TRACE) << "Radio: " << _rid;
  OTCLIB_TRACER(RADIO_TRACE) << ",
SmartRadio::cellmsg_pgonchan()"<<endl<<endl;

stop_t2ctimer();

// page responded
  _smcell->msg2mcc_pageresp(_rid, _callid, Bss2MccPageSuccess, 0, _esn);

GrsnFrame tf;
```

```
  _smcell->msg2bss_alert(_rid);
  start_alerttimer();
} void SmartRadio::cellmsg_pageresp()
{
  OTCLIB_TRACER(RADIO_TRACE) << "Radio: " << _rid;
  OTCLIB_TRACER(RADIO_TRACE) << ", SmartRadio::cellmsg_pageresp()" << endl;

_calltype = Trk2Mb;
  _frm.get_min(_min);
  _frm.get_esn(_esn);

OTCLIB_TRACER(RADIO_TRACE) << "Call Id: " << _callid;
  OTCLIB_TRACER(RADIO_TRACE) << ", MIN: " << _min;
  OTCLIB_TRACER(RADIO_TRACE) << ", ESN: " << _esn << endl << endl;

// assign the voice channel
  _smcell->msg2bss_tune2chan(_min, _rid);
  _smcell->msg2bss_seize(_rid, _rid);
  start_t2ctimer();
} void SmartRadio::cellmsg_answer()
{
  OTCLIB_TRACER(RADIO_TRACE) << "Radio: " << _rid;
  OTCLIB_TRACER(RADIO_TRACE) << ",
SmartRadio::cellmsg_answer()"<<endl<<endl;

stop_alerttimer();
  _smcell->msg2mcc_converse(_callid, ConnectSuccess);
} void SmartRadio::cellmsg_term(const GrsnFrame& f)
{
  OTCLIB_TRACER(RADIO_TRACE) << "Radio: " << _rid;
  OTCLIB_TRACER(RADIO_TRACE) << ", SmartRadio::cellmsg_term()" << endl;

_frm = f;
  int rsn = _frm.get_rsn();

OTCLIB_TRACER(RADIO_TRACE) << "Reason: " << rsn << endl <<endl;

_calltype = 0;
  int s = _fsm->get_state();
  if (s == RdoWaitTerm)
        cellmsg_release(rsn);
  else if (s == RdoOriginating)
        stop_t2ctimer();
  else if (s == RdoPageResped) {
        stop_t2ctimer();
        int rc;
        if (rsn == RcTermSatLost)
          rc = Bss2MccPageFailSATLost;
```

```cpp
        else if (rsn == RcTermNoST || rsn == RcTermSTTimeout)
            rc = Bss2MccPageFailAlertFail;
        else
            rc = Bss2MccPageFailUnknown;

_smcell->msg2mcc_pageresp(_rid, _callid, Bss2MccPageFail, rc);
    }
    else if (s > RdoOriginating) {
        _smcell->msg2mcc_relind(_callid, rsn);
        start_termtimer();
        set_state(RdoWaitRelConf);
        return;
    }
    set_state(RdoIdle);
} void SmartRadio::cellmsg_release(int rsn)
{
    OTCLIB_TRACER(RADIO_TRACE) << "Radio: " << _rid;
    OTCLIB_TRACER(RADIO_TRACE) << ", SmartRadio::cellmsg_release()";
    OTCLIB_TRACER(RADIO_TRACE) << ", Reason: " << rsn << endl;

_smcell->msg2mcc_relconf(_callid, rsn);
}

//--- message handlers for messages from MCC
void SmartRadio::mccmsg_page()
{
    OTCLIB_TRACER(RADIO_TRACE) << "Radio: " << _rid;
    OTCLIB_TRACER(RADIO_TRACE) << ", SmartRadio::mccmsg_page()" << endl;
    u_long cid; char* min;
    TTIPC& tt = TTIPC::instance();
    tt.get_msg();
    tt >> cid >> min;

OTCLIB_TRACER(RADIO_TRACE) << "Call id: " << cid;
    OTCLIB_TRACER(RADIO_TRACE) << ", Min: " << min << endl << endl;

_callid = cid;
    ::strcpy(_min, min);
    _calltype = Trk2Mb;
    _smcell->msg2bss_page(min);
    start_pagetimer();
} void SmartRadio::mccmsg_relreq()
{
    OTCLIB_TRACER(RADIO_TRACE) << "Radio: " << _rid;
    OTCLIB_TRACER(RADIO_TRACE) << ", SmartRadio::mccmsg_relreq()" << endl;
    if (get_state() != RdoIdle) {
        _smcell->msg2bss_relreq(_rid);
        stop_alerttimer();
        start_termtimer();
        set_state(RdoWaitTerm);
```

```
}
else
        _smcell->msg2mcc_relconf(_callid);
}

//------ some timers
void SmartRadio::dnld_timer(long sec, long usec)
{
  OTCLIB_TRACER(RADIO_TRACE) << "Radio: " << _rid;
  OTCLIB_TRACER(RADIO_TRACE) << ", SmartRadio::dnld_timer()" << endl << endl;
  sec,usec;
  if (_sendRetries++ < MaxSendRetries) {
        _smcell->send_rdopkt(_rid, _pktseqno);
        start_dnldtimer(_dnldTimerInt);
  }
  else
        set_state(RdoDnldFailed);
} void SmartRadio::start_dnldtimer(long sec, long usec)
{
  OTCLIB_TRACER(RADIO_TRACE) << "Radio: " << _rid;
  OTCLIB_TRACER(RADIO_TRACE) << ", SmartRadio::start_dnldtimer()"
<<endl<<endl;

stop_dnldtimer();
  Dispatcher::instance().startTimer(
                                        sec,usec,
                                        _iohdnldTimer,
        Dispatcher::VolatileType
                                        );
}
void SmartRadio::stop_all_timers()
{
        OTCLIB_TRACER(RADIO_TRACE>2) << "Radio: " << _rid;
   OTCLIB_TRACER(RADIO_TRACE>2) << ", SmartRadio::stop_all_timers()" <<endl;
        stop_origtimer();
        stop_termtimer();
        stop_pagetimer();
        stop_t2ctimer();
        stop_alerttimer();
} void SmartRadio::stop_dnldtimer()
{
  OTCLIB_TRACER(RADIO_TRACE>2) << "Radio: " << _rid;
  OTCLIB_TRACER(RADIO_TRACE>2) << ", SmartRadio::stop_dnldtimer()" <<endl;

Dispatcher::instance().stopTimer(_iohdnldTimer);
} void SmartRadio::orig_timer(long sec, long usec)
{
```

```
    OTCLIB_TRACER(RADIO_TRACE>2) << "Radio: " << _rid;
    OTCLIB_TRACER(RADIO_TRACE>2) << ", SmartRadio::orig_timer()" << endl <<
endl;
    sec,usec;
    // tear down the call and send the release to both side
    _smcell->msg2mcc_relind(_callid);
    _smcell->msg2bss_relreq(_rid);

set_state(RdoIdle);
} void SmartRadio::start_origtimer(long sec, long usec)
{
    OTCLIB_TRACER(RADIO_TRACE>2) << "Radio: " << _rid;
    OTCLIB_TRACER(RADIO_TRACE>2) << ", SmartRadio::start_origtimer()" << endl;

Dispatcher::instance().startTimer(
                                              sec, usec,
                                              _iohorigTimer,
            Dispatcher::VolatileType
                                                            );
} void SmartRadio::stop_origtimer()
{
    OTCLIB_TRACER(RADIO_TRACE>2) << "Radio: " << _rid;
    OTCLIB_TRACER(RADIO_TRACE>2) << ", SmartRadio::stop_origtimer()" << endl;

Dispatcher::instance().stopTimer(_iohorigTimer);
} void SmartRadio::start_termtimer(long sec, long usec)
{
        stop_termtimer();
        Dispatcher::instance().startTimer(
                                              sec, usec,
                                              _iohtermTimer,
            Dispatcher::VolatileType
                                                            );
}
void SmartRadio::stop_termtimer()
{
    OTCLIB_TRACER(RADIO_TRACE>2) << "Radio: " << _rid;
    OTCLIB_TRACER(RADIO_TRACE>2) << ", SmartRadio::stop_termtimer()" << endl;

Dispatcher::instance().stopTimer(_iohtermTimer);
} void SmartRadio::term_timer(long sec, long usec)
{
    // assume radio idle, add some check later on
    sec, usec;
```

```cpp
    set_state(RdoIdle);
} void SmartRadio::page_timer(long sec, long usec)
{
    OTCLIB_TRACER(RADIO_TRACE>2) << "Radio: " << _rid;
    OTCLIB_TRACER(RADIO_TRACE>2) << ", SmartRadio::page_timer()" << endl;
    sec, usec;
    set_state(RdoIdle);

// either retry or send page fail not found
    _smcell->msg2mcc_pageresp(_rid, _callid, Bss2MccPageFail,
Bss2MccPageFailNotFound);
} void SmartRadio::start_pagetimer(long sec, long usec)
{
    OTCLIB_TRACER(RADIO_TRACE>2) << "Radio: " << _rid;
    OTCLIB_TRACER(RADIO_TRACE>2) << ", SmartRadio::start_pagetimer()" << endl;
    sec, usec;
    Dispatcher::instance().startTimer(
                                        sec, usec,
                                        _iohpageTimer, Dispatcher::VolatileType
                                        );
} void SmartRadio::stop_pagetimer()
{
    OTCLIB_TRACER(RADIO_TRACE>2) << "Radio: " << _rid;
    OTCLIB_TRACER(RADIO_TRACE>2) << ", SmartRadio::stop_pagetimer()" <<endl;

Dispatcher::instance().stopTimer(_iohpageTimer);
}

//----- tune to channel timer
void SmartRadio::t2c_timer(long sec, long usec)
{
    OTCLIB_TRACER(RADIO_TRACE>2) << "Radio: " << _rid << endl;
    OTCLIB_TRACER(RADIO_TRACE>2) << "SmartRadio::t2c_timer()" <<endl<<endl;
    sec,usec;

// send page fail SAT
    int s = get_state();
    if (s == RdoPageResped)
        _smcell->msg2mcc_pageresp(_rid, _callid, Bss2MccPageFail,
Bss2MccPageFailSATLost);
    else if (s == RdoOriginating) {
        // retry here
        OTCLIB_TRACER(RADIO_TRACE)<<"Radio: "<<_rid <<" Originate Fail
!"<<endl;
    }
```

```
  set_state(RdoIdle);
} void SmartRadio::start_t2ctimer(long sec, long usec)
{
  OTCLIB_TRACER(RADIO_TRACE>2) << "Radio: " << _rid;
  OTCLIB_TRACER(RADIO_TRACE>2) << "SmartRadio::start_t2ctimer()" <<endl<<
endl;
  Dispatcher::instance().startTimer(
                                          sec, usec,
                                          _ioht2cTimer, Dispatcher::VolatileType
                                          );
} void SmartRadio::stop_t2ctimer()
{
  OTCLIB_TRACER(RADIO_TRACE>2) << "Radio: " << _rid;
  OTCLIB_TRACER(RADIO_TRACE>2) << ", SmartRadio::stop_t2ctimer()" << endl;
  Dispatcher::instance().stopTimer(_ioht2cTimer);
}

//----- alert timer
void SmartRadio::alert_timer(long sec, long usec)
{
  OTCLIB_TRACER(RADIO_TRACE) << "Radio: " << _rid;
  OTCLIB_TRACER(RADIO_TRACE) << ", SmartRadio::alert_timer()" << endl;

sec, usec;
  set_state(RdoIdle);

// send alert fail no answer
  _smcell->msg2mcc_pageresp(_rid, _callid, Bss2MccPageFail,
Bss2MccPageFailNoAnswer);
} void SmartRadio::start_alerttimer(long sec, long usec)
{
  OTCLIB_TRACER(RADIO_TRACE>2) << "Radio: " << _rid;
  OTCLIB_TRACER(RADIO_TRACE>2) << ", SmartRadio::start_alerttimer()" << endl;
  Dispatcher::instance().startTimer(
                                          sec, usec,
                                          _iohalertTimer, Dispatcher::VolatileType
                                          );
} void SmartRadio::stop_alerttimer()
{
  OTCLIB_TRACER(RADIO_TRACE>2) << "Radio: " << _rid;
  OTCLIB_TRACER(RADIO_TRACE>2) << ", SmartRadio::stop_alerttimer()" << endl;
  Dispatcher::instance().stopTimer(_iohalertTimer);
```

```
}
void SmartRadio::stop_wait_for_cfg()
{
  OTCLIB_TRACER(RADIO_TRACE>2) << "Radio: " << _rid;
  OTCLIB_TRACER(RADIO_TRACE>2) << ", SmartRadio::stop_wait_for_cfg()" <<
endl << endl;
  stop_cfgtimer();
} void SmartRadio::wait_for_cfg()
{
  OTCLIB_TRACER(RADIO_TRACE>2) << "Radio: " << _rid;
  OTCLIB_TRACER(RADIO_TRACE>2) << ", SmartRadio::wait_for_cfg()" << endl <<
endl;
  start_cfgtimer();
} void SmartRadio::cfg_timer(long sec, long usec)
{
  OTCLIB_TRACER(RADIO_TRACE>2) << "Radio: " << _rid;
  OTCLIB_TRACER(RADIO_TRACE>2) << ", SmartRadio::cfg_timer()" << endl <<
endl;
  sec,usec;

// config the radio
  stop_cfgtimer();
  cfg_radio();
  set_state(RdoConfiguring);
} void SmartRadio::start_cfgtimer(long sec, long usec)
{
  OTCLIB_TRACER(RADIO_TRACE>2) << "Radio: " << _rid;
  OTCLIB_TRACER(RADIO_TRACE>2) << ", SmartRadio::start_cfgtimer()" << endl;

stop_cfgtimer();
  Dispatcher::instance().startTimer(
                                              sec, usec,
                                              _iohcfgTimer,
          Dispatcher::VolatileType
                                              );
} void SmartRadio::stop_cfgtimer()
{
  OTCLIB_TRACER(RADIO_TRACE>2) << "Radio: " << _rid;
  OTCLIB_TRACER(RADIO_TRACE>2) << ", SmartRadio::stop_cfgtimer()" << endl;

Dispatcher::instance().stopTimer(_iohcfgTimer);
} void SmartRadio::start_dnld_image()
```

63

```
{
  OTCLIB_TRACER(RADIO_TRACE>2) << "SmartRadio::start_dnld_image()" << endl;
  if (get_state() != RdoDnlding) {
        _pktseqno   = 0;
        _sendRetries = 0;
        _smcell->start_dnld_rdoimage(_rid);
  }
} void SmartRadio::dnld_ack()
{
  OTCLIB_TRACER(RADIO_TRACE) << "SmartRadio::dnld_ack()";
  OTCLIB_TRACER(RADIO_TRACE) << ", Seq No: " << _frm.get_seqno() << endl;

if (_frm.get_ackflag()) {
        int sqn = _frm.get_seqno();
        if (sqn >= _pktseqno) {
          stop_dnldtimer();
          _pktseqno = sqn+1;
          if (_pktseqno < _smcell->_rpl->count()) {
                _smcell->send_rdopkt(_rid, _pktseqno);
                _smcell->send_radio_scellpkt_status(_rid, _pktseqno, _smcell->_rpl-
>count());
                _sendRetries = 0;
                start_dnldtimer(_dnldTimerInt);
          }
          else {
                OTCLIB_TRACER(RADIO_TRACE) << "Radio: " << _rid;
                OTCLIB_TRACER(RADIO_TRACE) << " downloaded Successfully !"
<<endl;
                set_state(RdoDnldOk);
                _isLoaded = 1;
          }
        }
        else if (sqn == (_pktseqno - 1) ) {
          stop_dnldtimer();
          _pktseqno = sqn;
          if (_pktseqno < _smcell->_rpl->count()) {
                _smcell->send_rdopkt(_rid, _pktseqno);
                _smcell->send_radio_scellpkt_status(_rid, _pktseqno, _smcell->_rpl-
>count());
                _sendRetries = 0;
                start_dnldtimer(_dnldTimerInt);
          }
          else {
                OTCLIB_TRACER(RADIO_TRACE) << "Radio: " << _rid;
                OTCLIB_TRACER(RADIO_TRACE) << " downloaded Successfully !"
<<endl;
                set_state(RdoDnldOk);
                _isLoaded = 1;
          }
        }
  }
}
```

```
}
const char* SmartRadio::get_strstate() const
{
  return RdoStStr[get_state()];
} int SmartRadio::is_rdoincall() const
{
  return (get_state() > RdoIdle && get_state() < RdoDown);
} int SmartRadio::dnld_image(const char* imagefilename)
{
  if (imagefilename) strcpy(_imagefile, imagefilename);
  return _smcell->dnld_file(_imagefile, _rid);
} void SmartRadio::cfg_radio()
{
  _smcell->msg2bss_cfgradio(
                                        _rid,
                                        _rdocfg._type,
                                        _rdocfg._sat,
                                        _rdocfg._pwr,
                                        _rdocfg._chnl,
                                        _rdocfg._mode,
                                        _rdocfg._aveprd,
                                        _rdocfg._diff,
                                        _rdocfg._dcc
                                        );
} int SmartRadio::load_statetbl(const char* tblname)
{

_fsm->reg_statetbl(
                                        RdoIdle,
                                        AtgEvOrig,
                                        RdoOriginating,
                                        new ActionCallback(SmartRadio)( this, &SmartRadio::cellmsg_orig

)
                                        );

_fsm->reg_statetbl(
                                        RdoOriginating,
                                        AtgEvOnChan,
                                        RdoOnChannel,
                                        new ActionCallback(SmartRadio)(
```

65

```
                    this,

&SmartRadio::cellmsg_onchan

)
                                        );
#if 0
_fsm->reg_statetbl(
                                        AnyState,
                                        AtgEvTerm,
                                        RdoWaitRelConf,
                                        new ActionCallback(SmartRadio)( this, &SmartRadio::cellmsg_term )
                                        );
#endif
_fsm->reg_statetbl(
                                        RdoOnChannel,
                                        MccEvAccept,
                                        RdoSpeech,
                                        new ActionCallback(SmartRadio)( this, &SmartRadio::stop_origtimer )
                                        );
_fsm->reg_statetbl(
                                        AnyState,
                                        MccEvRelReq,
                                        AnyState,
                                        new ActionCallback(SmartRadio)( this, &SmartRadio::mccmsg_relreq )
                                        );
// handle trunk to mobile calls //------ radio responded to the page
_fsm->reg_statetbl(
                                        RdoIdle,
                                        AtgEvPageResp,
```

```
                                RdoPageResped,
                                new ActionCallback(SmartRadio)(
        this, &SmartRadio::cellmsg_pageresp )
                                );
//------ radio tuned to the assigned voice channel
_fsm->reg_statetbl(
                                RdoPageResped,
                                AtgEvOnChan,
                                RdoAlerting,
                                new ActionCallback(SmartRadio)(
        this, &SmartRadio::cellmsg_pgonchan )
                                );
//------ radio answered the alert
_fsm->reg_statetbl(
                                RdoAlerting,
                                AtgEvAnswer,
                                RdoSpeech,
                                new ActionCallback(SmartRadio)(
        this, &SmartRadio::cellmsg_answer )
                                );
//------ handle some stat and level change message
//------ update the radio status at any time
_fsm->reg_statetbl(
                                AnyState,
                                AtgEvRadioStat,
                                AnyState,
                                new ActionCallback(SmartRadio)(
        this, &SmartRadio::cellmsg_radiostat )
                                );
//------ update the mobile's receiving or SAT indicator
_fsm->reg_statetbl(
                                AnyState,
```

67

```
                                        AtgEvLevelChg,
                                        AnyState,
                                        new ActionCallback(SmartRadio)(
    this, &SmartRadio::cellmsg_lvlchg

)
                                            );

//------ update the mobile's receiving or RSSI indicator
_fsm->reg_statetbl(
                                        AnyState,
                                        AtgEvMeasAck,
                                        AnyState,
                                        new ActionCallback(SmartRadio)(
    this, &SmartRadio::cellmsg_measack

)
                                            );

//------ downloading
_fsm->reg_statetbl(
                                        AnyState,
                                        AtgEvDnldRadio,
                                        RdoDnlding,
                                        new ActionCallback(SmartRadio)(
    this, &SmartRadio::start_dnld_image

)
                                            );

_fsm->reg_statetbl(
                                        AnyState,
                                        AtgEvDnldAck,
                                        AnyState,
                                        new ActionCallback(SmartRadio)(
    this, &SmartRadio::dnld_ack )
                                            );
return 0;
}
```

The third object-component to the software applications of the adjunct node-processor 12 is the matrix-switch interface object software application. This component like the cell-site interface objects application, also includes an embedded state table in the object-software for creating a pointer. The following is the software listing of the matrix-switch interface object software application with its embedded state table.

```
#include "exclient/exCallHandler.h"
#include <OTC/colletn/prmodifr.hh>
#include "exclient/exPort.h"
#include "exclient/exhandler.h"
exCallHandler::exCallHandler( )
{
}
exCallHandler::~exCallHandler( )
{
}
void exCallHandler::parent(exhandler* p)
{
    _parent = p;
}
int exCallHandler::deleteCall(unsigned long cid)
{
    if(callId2portMap.contains(cid) ==OTCLIB_TRUE)
    {
        OTC_Modifier<int>mainIter = getPortIter(cid);
        OTC_List<int>tmpList;
        for(mainIter.reset( ); mainIter.isValid( ); mainIter.next( ))
        {
            tmpListaddLast(mainIter.item( ));
        }
        OTC_Modifier<int>iter = tmpList.items( );
        for(iter.reset( ); iter.isValid( ); iter.next( ))
        {
            deletePortFromCall(cid, iter.item( ));
        }
    }
    return 0;
}
int exCallHandler::addPortToCall(unsigned long cid, int port)
{
    OTC_List<int>* tmpList;
    if(port2callIdMap.contains(port) == OTCLIB_TRUE)
    {
        unsigned long badCallId = port2callIdMap.item(port);
        deleteCall(badCallId);
        cout << "duplicate port in exCallHandler::addPortToCall cid = ";
        cout << cid <<", port =" << port < endl;
    }
    port2callIdMap.add(port, cid);
    if(callId2portMap.contains(cid) == OTCLIB_TRUE)
    {
        tmpList = callId2portMap.item(cid);
    }
    else
    {
        tmpList = new OTC_List<int>;
        callId2portMap.add(cid, tmpList);
    }
    tmpList->addLast(port);
    return 0;
}
int exCallHandler::deletePortFromCall(unsigned long cid, int port)
{
    if(port2callIdMap.contains(port))
    {
        _parent<>dialPlan( )<>setPortState(port, exPort::PORT_IS);
        port2callIdMap.remove(port);
    }
    if(callId2portMap.contains(cid))
    {
        OTC_List<int>* tlist = callId2portMap.item(cid);
        OTC_Modifier<int> iter = tlist->items( );
        u_int i = 0;
        for(iter.reset( ); iter.isValid( ); iter.next( ))
        {
            if(iter.item( ) == port)
```

-continued

```
            {
                tlist->removeItem(i);
                break;
            }
            i++;
        }
        if(tlist->population( ) ==0)
        {
            callId2portMap.remove(cid);
        }
    }
    return 0;
}
unsigned long exCallHandler::getCallId(int port)
{
    if(port2callIdMap.contains(port))
    {
        return(port2callIdMap.item(port));
    }
    else
    {
        return(0xffffffff);
    }
}
OTC_Modifier<int> exCallHandler::getPortIter(unsigned long cid)
{
    if(callId2portMap.contains(cid) == OTCLIB_TRUE)
    {
        return(callId2portMap.item(cid)->items( ));
    }
    return(emptyList.items( ));
}
void exCallHandler::print( )
{
    OTC_Modifier<OTC_List<int>*>mapIter = callId2portMap.items( );
    cout << "callId2portMap;" << endl;
    for(mapIter.reset( );mapIter.isValid( );mapIter.next( ))
    {
        cout < "new call id";
        OTC_Modifier<int>listIter = mapIter.item( )-items( );
        for(listIter.reset( );listIter.isValid( );listIter.next( ))
        {
            cout << " " <<listIter.item( );
        }
        cout << endl << endl;
    }
    cout<< "port2callIdMap;" << endl;
    OTC_Modifier<unsigned long>pmapIter = port2callIdMap.items( );
    for(pmapIter.reset( );pmapIter.isValid( );pmapIter.next( ))
    {
        cout << pmapIter.item( ) << ";";
        OTC_Modifier<int>listIter =
                callId2portMap.item(pmapIter.item( ))->items( );
        for(listIter.reset( );listIter.isValid( );listIter.next( ))
        {
            cout << " " <<listIter.item( );
        }
        cout << endl;
    }
}
void exCallHandler::deleteAllCalls( )
{
    OTC_PairModifier<unsigned long, OTC_List<int>*> mapIter =
        callId2portMap.pairs( );
    for(mapIter.reset( );mapIter.isValid( );mapIter.next( ))
    {
        unsigned long cid = mapIter.key( );
        cout << "Deleting Call" << cid << endl;
        _parent->getMsgObj(0x08)->emergencyRelease(cid);
        deleteCall(cid);
    }
}
```

As discussed previously, since the node-controller 12 of each hub-site performs all of the central operational and control functions for each node, or hub, the system of the invention is able to interconnect many nodes of many hubs together to form one whole system. Such a system may encompass an entire geographical area, such as a country, whereby the entire country is linked together by the system of the invention.

Figure 5:
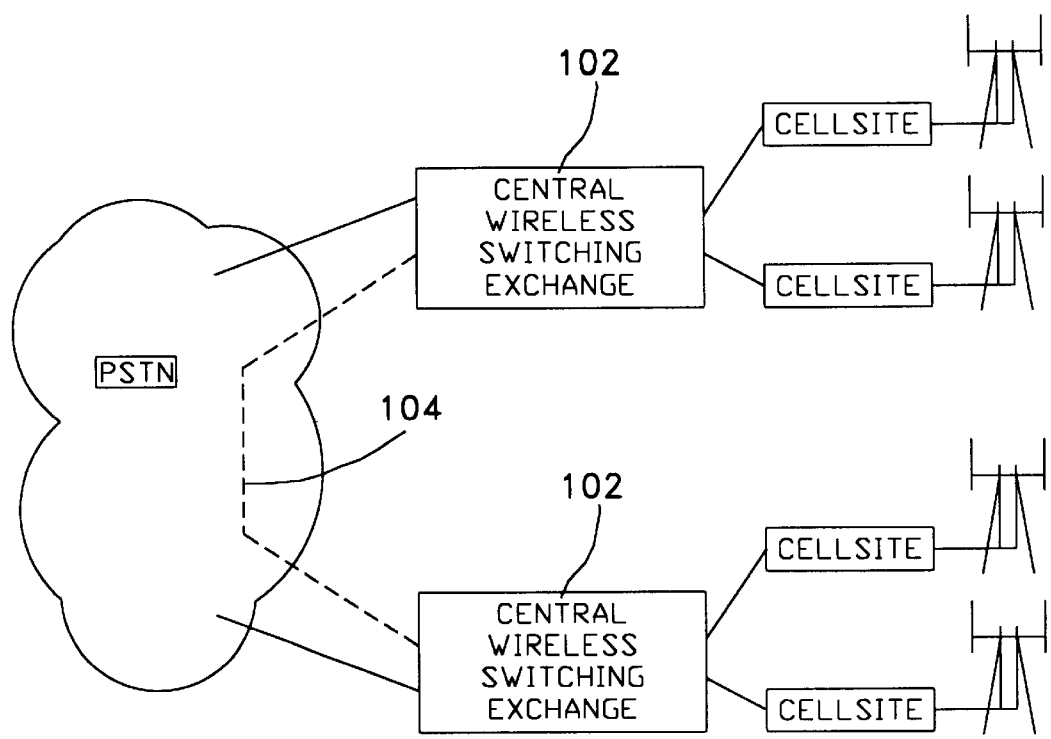
FIG. 5 is a block diagram showing a prior-art multi-node system.

Traditional embodiments of wireless telephony communication systems, such as cellular, typically utilize modified wireline telephony switch equipment to perform additional functions related to wireless and mobile-phone operation. The modifications to such wireline switching equipment allow the switching equipment to connect cell-sites, where the R.F. equipment is located, and which communicates with the mobile-phone subscribers. In addition, the switch generally contains additional capabilities to support mobility; essentially, this involves the re-connection of calls as mobile users move from one cell-site to another cell-site, or call hand-off, along with inter-operation with other mobile system-switches for the purpose of call-delivery, roamer-validation, and billing. Inter-system operation in North America, for example, typically uses the industry standard "Signaling System Seven " (SS7) suite of protocols for messaging and call control. These prior-art systems use a centralized system architecture, with complex and costly interconnection between switching exchange nodes according to defined industry-standards, in order to achieve wide-area operation. FIG. 5 depicts such a prior art system, where two such wireless switching exchange nodes 100, 102 are connected together via a SS7 link 104. The system of the invention uses a totally different architecture, as shown in FIG. 6.

The architecture of the system of the invention follows the principle that the system nodes are essentially standard personal computers, which control call-processing functions locally, but communicate and interact with each other using over the internode message-links, using standard computer data networking components. This represents a major cost saving over the traditional architecture which must use costly, dedicated SS7 links, or possibly X.25 data network. In addition to cost savings, the internal node structure of the invention is architectured such that the network can support configurations and capabilities that are not practical in traditional architectures. This is achieved by ensuring, in the software design, that all processes can execute on any node in the system. In the system of the invention, separate software processes are defined which handle call processing, subscriber and system equipment administration, and roaming control (i.e. home-location register/visitor-location register). Being able to operate on any node in the system, means that a spatially-redundant network-architecture is possible. In the event of a failure of network roaming-control on one roaming node's computer, a redundant roaming control-process on a designated back-up node elsewhere can take over and ensure continued operation. Prior-art systems provide only back-up by duplication of the hardware and software, at the system location only; if the location suffers a catastrophic event (e.g. fire, earthquake, terrorist blast, etc.), then, operation is lost, since both the main and back-up components are compromised.

Figure 6:
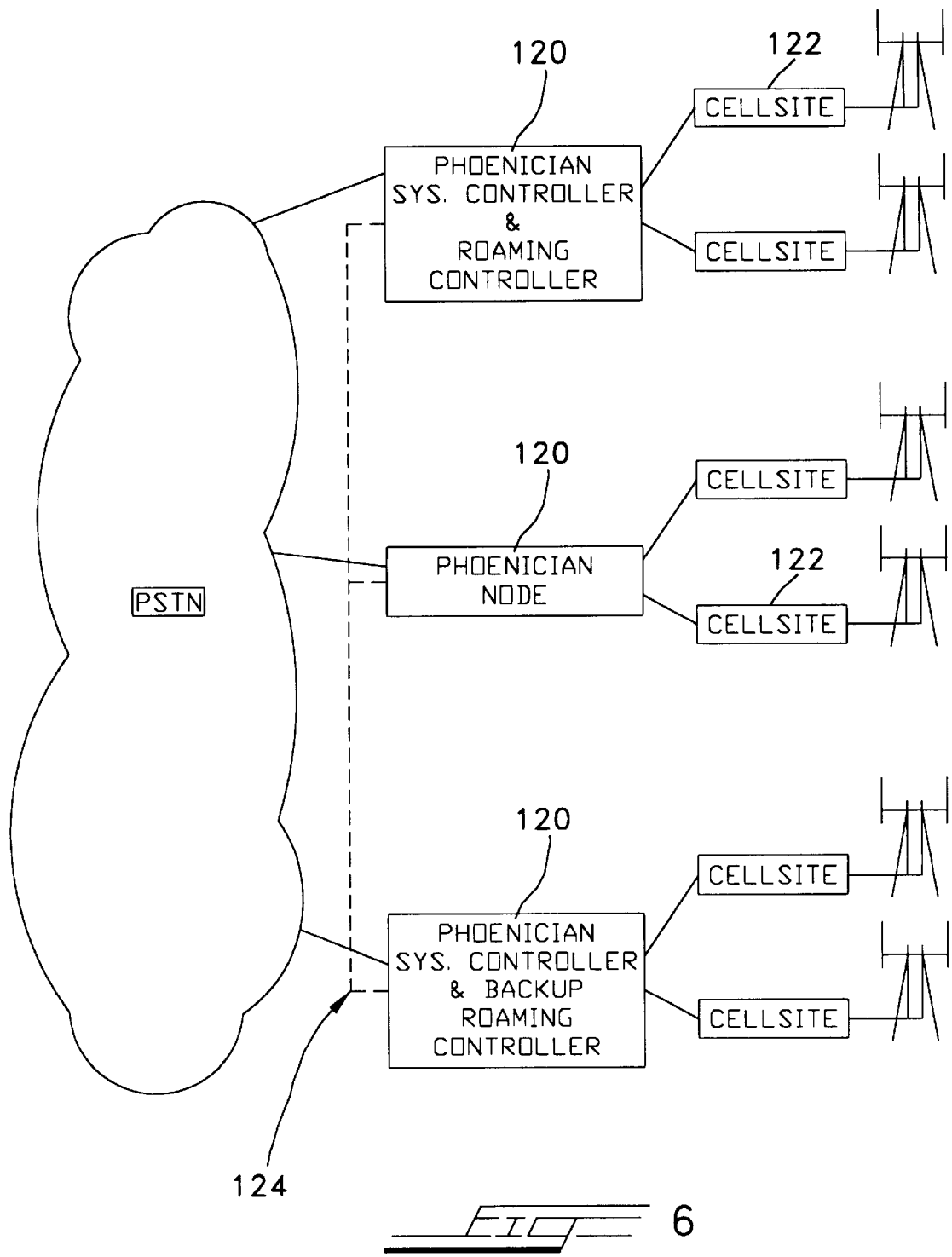
FIG. 6 is a block diagram showing a multi-node system of the present invention.

Referring now to FIG. 6, the nodal, architectural network of the invention is shown, which is comprised of many adjunct node-processors 120, each serving a plurality of cell-sites 122. Each adjunct node-processor is linked conventionally to the PSTN, and, moreover, to each adjunct node-processor of all of the many other hubs of the network, by an internode message link 124. Thus, when any one adjunct node-processor of a hub fails or must be shut down, all of its functions may be taken over by the adjunct node-processor of a neighboring hub, including the functions of call-processing, billing, roaming, etc.

An additional feature of the system of the invention is concerned with integral, hierarchical, generic alarm-management. As discussed above, the system of the invention allows internodal connection between all of the adjunct node-processors personal computers of all of the hubs of the network. Such architecture of the invention, therefore, allows for any one adjunct node-processor of one hub to take over the alarm-management functions of another adjunct node-processor of a different hub. Alarm-management functions of a adjunct node-processor monitor for the proper operations and functioning of each base station of a cell-site linked to it, and the switching matrix equipment coupled it to the PSTN, as well as monitoring itself for proper operation.

Figure 7:
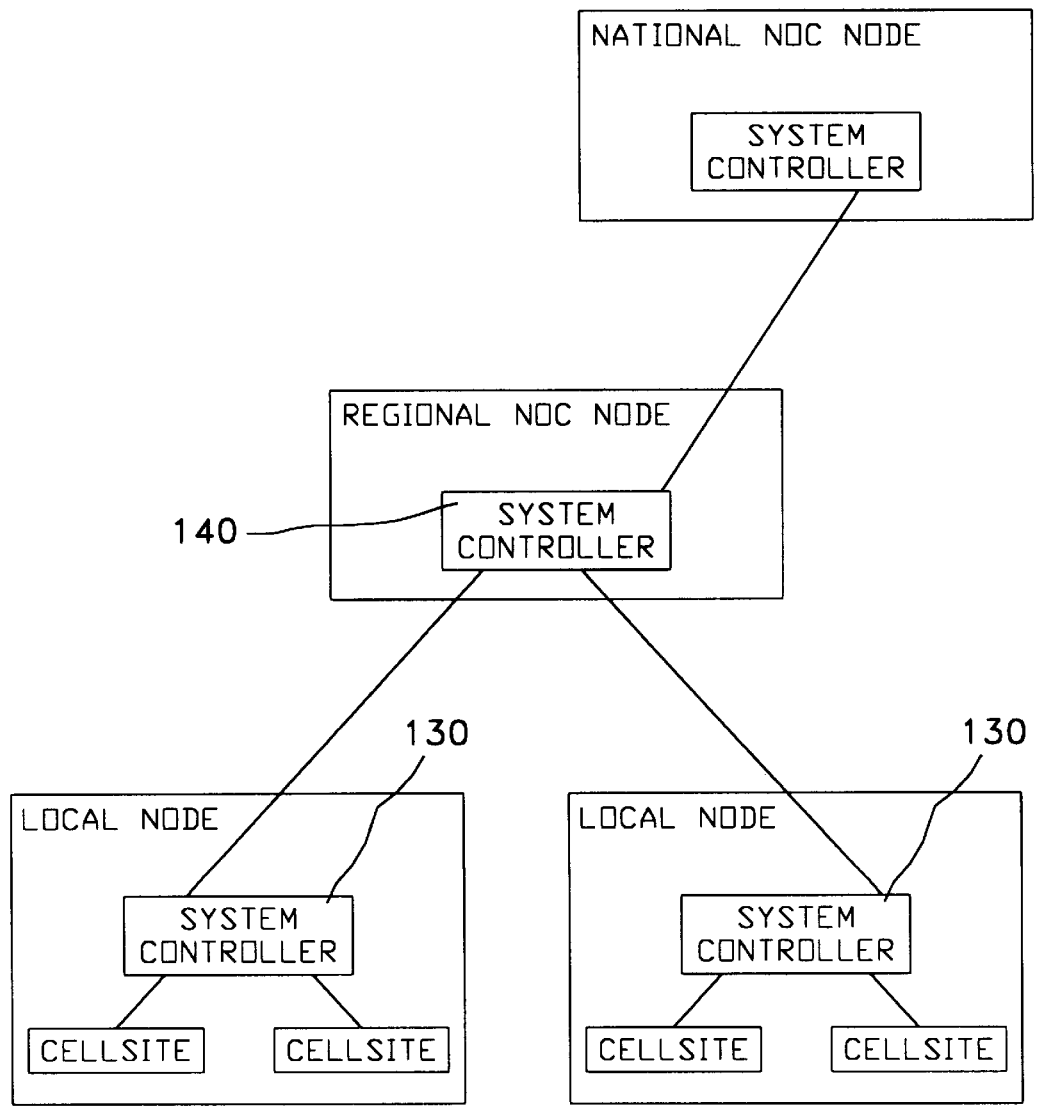
FIG. 7 is a block diagram showing the integral, hierarchical, generic alarm-management system according to the invention.

Referring to FIG. 7, the multinode architecture of the invention allows for the exchange of alarm-information between nodes 130 over the internode links, as discussed above. This arrangement yields a simple, yet flexible, hierarchical alarm-management system capable of providing round-the-clock alarm-management for systems around the world. In the embodiment shown in FIG. 7, each node system-controller 130 in the network, which includes the Network Operations Center's (NOC) system-controller, has a copy of the generic, alarm-handler process running. The alarm-handler process can accept alarm-input messages from both peripheral system equipment at that node (i.e. base stations, switch component, etc.) or from other nodes in the system. The alarm-handler uses a lookup into a database to determine the appropriate action to be taken upon receipt of an alarm-message. Depending on the configuration defined by the network operator, this may include sending an alpha-numeric message to a defined pager number, sending a fax to a defined fax-number, playing an audio file on the adjunct node-processor, or sending e-mail with alarm-details to a defined e-mail address. In addition, the alarm-handler can simply forward the message to other nodes, as defined in the alarm-profile. In operation, at a local node, each alarm-signal received by the adjunct node-processor thereof is forwarded to the regional control center 140. From this center, only high-priority and critical alarms are forwarded to the national NOC 150. The NOC system-controller may be configured to forward critical, priority alarms to the world headquarters.

The software listing for this alarm-management is shown hereinbelow.

 chris @ wormhole.pwgi.com (Chris Matthies)
07/03/96 11:36 AM

To: gullifor @ pwgi.com @ inet
cc: (bcc: Dan Gulliford/Phoenix Wireless Group Inc)
Subject: patent again....

- - - - - - - - - -
X-Sun-Data-Type: text
X-Sun-Data-Description: text
X-Sun-Data-Name: text
X-Sun-Charset: us-ascii
X-Sun-Content-Lines: 1

Here you go......
- - - - - - - - - -
X-Sun-Data-Type: default
X-Sun-Data-Description: default
X-Sun-Data-Name: AlmMsgKit.C
X-Sun-Charset: us-ascii
X-Sun-Content-Lines: 666

```
#include <unistd.h>
#include <fstream.h>
#include "alarm/AlmMsgKit.h"
#include "alarm/Alarm.h"
#include "alarm/AlmEntry.h"
#include "utlLib/sysincludes.h"

//extern "C" int gettimeofday (struct timeval *tp);

// globals...
extern Dispatcher    *disp;
extern OTC_TraceTag ALARM_TRACE;
extern TTIPC        *ipc;

// io handlers for the alarm message kits
implementActionCallback(AudioMsgkit);
implementIOCallback(AudioMsgkit);

/*
-------------------------------------------------------------
---------------*/
AudioMsgkit::AudioMsgkit()
    : _actionSec(30), _actionUSec(0), _active(1), _playioh(0), _timerActive(0)
```

```
{
}
/*
------------------------------------------------------------
---------------*/
AudioMsgkit::~AudioMsgkit()
{
        if ( _timerActive )
                cancel();

// remove the action for play timer
        delete _playioh;
}
/*
------------------------------------------------------------
---------------*/
int
AudioMsgkit::init(Alarm *alm, AlmEntry *almEntry)
{
        // extract the audio info from the
        // the alarm entry
        if ( !almEntry->audio() ) {
                _active = 0;
                return 1;
        }

// pointer to parent alarm incase needed
        _parent = alm;

// build a file using the name of the alarm
        SPString aname  = _parent->name();
        aname      += ".au";
        set_audio_file(aname);

// audio required so get timer value
        if ( almEntry->level() == AlmEntry::ALARM_LEVEL_INFO ){
                set_timer_values("ALARM_INFO_TIMER");
                if ( access(_auFile, F_OK) == -1 )
                        set_audio_file("information.au");
        }
        else if ( almEntry->level() == AlmEntry::ALARM_LEVEL_WARN ){
                set_timer_values("ALARM_WARN_TIMER");
                if ( access(_auFile, F_OK) == -1 )
```

```
                set_audio_file("warning.au");
        }
        else if ( almEntry->level() == AlmEntry::ALARM_LEVEL_CRITICAL ){
                set_timer_values("ALARM_CRITICAL_TIMER");
                if ( access(_auFile, F_OK) == -1 )
                        set_audio_file("critical.au");
        }

// set the volume for the audio
        set_audio_gain();

// create an io handler for the timer
        _playioh = new IOCallback(AudioMsgkit)(this,&AudioMsgkit::play_timer);
        return 1;
}
/*
-------------------------------------------------------------------
---------------*/
int
AudioMsgkit::execute(int arg)
{
        // temporary hack till audio ready
        SPString cmd = "cat ";
        cmd         += _auFile + " > /dev/audio &";
        ::system(cmd);
        return 1;
}
/*
...................................................................
...............*/
int
AudioMsgkit::schedule()
{
        disp->startTimer(_actionSec, _actionUSec, _playioh, Dispatcher::PermanentType);
        _timerActive = 1;
        return 1;
}
/*
-------------------------------------------------------------------
---------------*/
int
AudioMsgkit::cancel()
{
        disp->stopTimer(_playioh);
        _timerActive = 0;
        return 1;
```

```
}
/*
---------------------------------------------------------------
---------------*/
void
AudioMsgkit::play_timer(long sec, long usec)
{
        // play the audio file
        execute();
}
/*
---------------------------------------------------------------
---------------*/
void
AudioMsgkit::set_audio_file(const char *fname)
{
        // get the full path to the file name
        char *tmp;
        _auFile = (tmp = getenv("WACS_HOME")) != 0 ? tmp : "/src/work/WACS";
        _auFile += "/sounds/";
        _auFile += fname;
}
/*
---------------------------------------------------------------
---------------*/
void
AudioMsgkit::set_timer_values(const char *env)
{
        char *tmp;
        _actionSec = (tmp = getenv(env)) != 0 ? atoi(tmp) : 30;

}
/*
---------------------------------------------------------------
---------------*/
void
AudioMsgkit::set_audio_gain()
{

}
/*
---------------------------------------------------------------
---------------*/
int
```

```
AudioMsgkit::status()
{
        return _active;
}
/*
-----------------------------------------------------------------
---------------*/
//    ••••••••••••••••• GUI  Message  Kit  •••••••••••••••••
/*
-----------------------------------------------------------------
---------------*/
GuiMsgkit::GuiMsgkit()
        : _parent(0), _active(1)

{

}
/*
-----------------------------------------------------------------
---------------*/
GuiMsgkit::~GuiMsgkit()
{
}
/*
-----------------------------------------------------------------
---------------*/
int
GuiMsgkit::init(Alarm *alm, AlmEntry *almEntry)
{
        // pointer to parent alarm incase needed
        _parent = alm;

return 1;
}
/*
-----------------------------------------------------------------
---------------*/
int
GuiMsgkit::execute(int arg)
{
        ipc->create_msg();
        *ipc << _parent->id() << _parent->name()
             << _parent->supplement() << _parent->date() << _parent->level();
        ipc->send_msg(Alm2AlmGuiNewAlarm);
```

```
        return 1;
}
/*-----------------------------------------------------------
-----------------*/
int
GuiMsgkit::schedule()
{
        // NOOP
        return 1;
}
/*-----------------------------------------------------------
-----------------*/
int
GuiMsgkit::cancel()
{
        // tell the gui were clearing the alarm
        ipc->create_msg();
        *ipc << _parent->id();
        ipc->send_msg(Alm2AlmGuiDeleteAlarm);

return 1;
}
/*-----------------------------------------------------------
-----------------*/
int
GuiMsgkit::status()
{
        return _active;
}

/*      -----------------------------------------------
-------------------------------*/
//      ***************** Printer  Message  Kit *****************
/*-----------------------------------------------------------
-----------------*/
AlmPrinterMsgkit::AlmPrinterMsgkit()
        : _parent(0), _active(1)

{

}
/*
```

```
/* ----------------------------------------------------------------
   ----------------*/
AlmPrinterMsgkit::~AlmPrinterMsgkit()
{
}
/*
   -----------------------------------------------------------------
   ----------------*/
int
AlmPrinterMsgkit::init(Alarm *alm, AlmEntry *almEntry)
{
        // extract the audio info from the
        // the alarm entry
        if ( !almEntry->printer() ) {
                _active = 0;
                return 1;
        }
        _almEntry = almEntry;

// pointer to parent alarm incase needed
        _parent = alm;

return 1;
}
/*
   -----------------------------------------------------------------
   ----------------*/
int
AlmPrinterMsgkit::execute(int arg)
{
        // open a file to place the report data
        SPString compFile = "/tmp/almprinter.tmp";
        ofstream ofs(compFile);
        if ( !ofs ){
                return 0;
        }

// insert the report header
        SPString header = ".de TP\n";
        ofs << header;
        header = ".po 1.25i\n";
        ofs << header;
        header = ".lt \\\\n[@ll]u\n";
        ofs << header;
        header = ".ie ((\\\\n[%]=1)&(\\\\n[N]=1):(\\\\n[N]=2)) .sp\n";
        ofs << header;
```

```
header = ".el .tl \\\\*[pg*header]\n";
ofs << header;
header = ".ie o .tl \\\\*[pg*odd-header]\n";
ofs << header;
header = ".el .tl \\\\*[pg*even-header]\n";
ofs << header;
header = "'sp 2\n";
ofs << header;
header = "..\n";
ofs << header;
header = ".S 14 15\n";
ofs << header;
header = ".PH \"\"\n";
ofs << header;
header = ".ce\n";
ofs << header;

// troff bold labels
SPString beginBold = "\\f3";
SPString endBold   = "\\f1";

SPString body = beginBold + "WCP Alarm Report";
body += endBold;
body += "\n";
body += ".sp 3\n";
body += ".S 12 13\n";
ofs << body;

body = beginBold + "Alarm ID: ";
body += endBold;
body += _parent->id();
body += "\n.sp\n";
ofs << body;

body = beginBold + "Alarm Name: ";
body += endBold;
body += _parent->name();
body += "\n.sp\n";
ofs << body;

body = beginBold + "Alarm Date: ";
body += endBold;
body += _parent->date();
body += "\n.sp\n";
ofs << body;
```

```
// determin the priority of the message
SPString pri;
if( _almEntry->level() == AlmEntry::ALARM_LEVEL_INFO )
        pri = "Informational";
else if( _almEntry->level() == AlmEntry::ALARM_LEVEL_WARN )
        pri = "Warning";
else if( _almEntry->level() == AlmEntry::ALARM_LEVEL_CRITICAL )
        pri = "Critical";

body = beginBold + "Alarm Level: ";
body += endBold;
body += pri;
body += "\n.sp\n";
ofs << body;

body = beginBold + "Process Message: ";
body += endBold;
body += _parent->supplement();
body += "\n.sp\n";
ofs << body;

body = beginBold + "Description: ";
body += endBold;
body += "\n";
body += "\n.sp .5\n";
body += _almEntry->description();
ofs << body;

ofs.close();

// now build the command to print the file
char *tmp;
SPString cmd    = (tmp = getenv("WCP_ALARM_PRINT_FMT_CMD"))
        ? tmp : "/usr/local/bin/groff -mgm";
SPString printer = (tmp = getenv("WCP_PRINTER"))
        ? tmp : "lp";
cmd     += " ";
cmd     += compFile + " | ";
cmd     += printer;
cout << "cmd: " << cmd << endl;
::system(cmd);

return 1;
}
/*
```

```
·············*/
int
AlmPrinterMsgkit::schedule()
{
    // NOOP
    return 1;
}
/*
···································································
················*/
int
AlmPrinterMsgkit::cancel()
{
    // NOOP
    return 1;
}
/*
···································································
················*/
int
AlmPrinterMsgkit::status()
{
    return _active;
}
/*
···································································
···············*/
//    ················ E-Mail   Message   Kit   ················
/*
···································································
················*/
AlmMailMsgkit::AlmMailMsgkit()
    : _parent(0), _active(1)

{

}
/*
···································································
················*/
AlmMailMsgkit::~AlmMailMsgkit()
{
}
/*
···································································
··············*/
```

```
int
AlmMailMsgkit::init(Alarm *alm, AlmEntry *almEntry)
{
        // extract the audio info from the
        // the alarm entry
        if ( !almEntry->mail() ) {
                _active = 0;
                return 1;
        }
        _almEntry = almEntry;

// pointer to parent alarm incase needed
        _parent = alm;

return 1;
}
/*
------------------------------------------------------------
---------------*/
int
AlmMailMsgkit::execute(int arg)
{
        // open a file to place the report data
        SPString compFile = "/tmp/almmail.tmp";
        ofstream ofs(compFile);
        if ( !ofs ){
                return 0;
        }

SPString body = "From: WCP Alarm Daemon\n";
        ofs << body;

body = "Subj: WCP Alarm Report\n\n";
        ofs << body;

body = "Alarm ID: ";
        body += _parent->id();
        body += "\n";
        ofs << body;

body = "Alarm Name: ";
        body += _parent->name();
        body += "\n";
        ofs << body;

body = "Alarm Date: ";
```

```
            body += _parent->date();
            body += "\n";
            ofs << body;

// determin the priority of the message
            SPString pri;
            if( _almEntry->level() == AlmEntry::ALARM_LEVEL_INFO )
                    pri = "Informational";
            else if( _almEntry->level() == AlmEntry::ALARM_LEVEL_WARN )
                    pri = "Warning";
            else if( _almEntry->level() == AlmEntry::ALARM_LEVEL_CRITICAL )
                    pri = "Critical";

body = "Alarm Level: ";
            body += pri;
            body += "\n";
            ofs << body;

body = "Process Message: ";
            body += _parent->supplement();
            body += "\n";
            ofs << body;

body = "Description: ";
            body += "\n";
            body += _almEntry->description();
            ofs << body;

ofs.close();

// now build the command to print the file
            SPString cmd  = "/bin/mail < " ;
            cmd         += compFile + " ";
            cmd         += _almEntry->mail_address();
            cout << "cmd: " << cmd << endl;
            ::system(cmd);

return 1;
}
/*.................................................................
...............*/
int
AlmMailMsgkit::schedule()
{
        // NOOP
```

```
        return 1;
}
/*
................................................................
.................*/
int
AlmMailMsgkit::cancel()
{
        // NOOP
        return 1;
}
/*
................................................................
.................*/
int
AlmMailMsgkit::status()
{
        return _active;
}

/*
................................................................
.................*/
//       ****************  Log/Database Message Kit  ****************
/*
................................................................
.................*/
AlmLogMsgkit::AlmLogMsgkit()
        : _parent(0), _active(1)

{

}
/*
................................................................
.................*/
AlmLogMsgkit::~AlmLogMsgkit()
{
        // remove this alarm from the active db
        // and add a message to the log file that
        // a clear/acknowledge has been received
        remove_active_alarmdb();
        update_log_file();
}
/*
```

```
                       */
int
AlmLogMsgkit::init(Alarm *alm, AlmEntry *almEntry)
{
        _almEntry = almEntry;

// pointer to parent alarm incase needed
        _parent = alm;

return 1;
}
/* ............................................................
   .................*/
int
AlmLogMsgkit::execute(int arg)
{
        if ( !arg ) {

// store data in active alarm data base
                store_active_alarmdb();

// store data in log file
                store_log_file();
        } return 1;
}
/* ............................................................
   .................*/
void
AlmLogMsgkit::store_active_alarmdb()
{
        // create an alarm entry and store in the
        // data base
        _parent->store();
}
/* ............................................................
   .................*/
void
AlmLogMsgkit::remove_active_alarmdb()
{
        // delete an alarm entry from the
        // data base
```

```
        _parent->remove();
}
/* ----------------------------------------------------------------
   --------------- */
void
AlmLogMsgkit::store_log_file()
{
        // open a file to place the report data
        set_log_file();
        ofstream ofs(_logFile, ios::app);
        if ( !ofs ){
                return;
        }

// create a header on the top of the page for column
        SPString body = "--- Alarm Id: ";
        body += _parent->id();

body += " Alarm Name: ";
        body += _parent->name();

body += " Alarm Date: ";
        body += _parent->date();

// determin the priority of the message
        SPString pri;
        if( _almEntry->level() == AlmEntry::ALARM_LEVEL_INFO )
                pri = "Informational";
        else if( _almEntry->level() == AlmEntry::ALARM_LEVEL_WARN )
                pri = "Warning";
        else if( _almEntry->level() == AlmEntry::ALARM_LEVEL_CRITICAL )
                pri = "Critical";

body += " Alarm Level: ";
        body += pri;

body += " Action: TRIGGERED";

body += " Process Message: ";
        body += _parent->supplement();

body += " Description: ";
        body += _almEntry->description();
        ofs << body << endl;
```

```
        ofs.close();
}
/*
................................................................
...............*/
void
AlmLogMsgkit::update_log_file()
{
        // open a file to place the report data
        set_log_file();
        ofstream ofs(_logFile, ios::app);
        if ( !ofs ){
                return;
        }

// create a header on the top of the page for column
        SPString body = "--- Alarm Id: ";
        body += _parent->id();

body += " Alarm Name: ";
        body += _parent->name();

body += " Alarm Date: ";
        body += timestamp();

// determin the priority of the message
        SPString pri;
        if( _almEntry->level() == AlmEntry::ALARM_LEVEL_INFO )
                pri = "Informational";
        else if( _almEntry->level() == AlmEntry::ALARM_LEVEL_WARN )
                pri = "Warning";
        else if( _almEntry->level() == AlmEntry::ALARM_LEVEL_CRITICAL )
                pri = "Critical";

body += " Alarm Level: ";
        body += pri;

body += " Action: CLEARED";

ofs << body << endl;

ofs.close();
}
/*
................................................................
...............*/
```

```
int
AlmLogMsgkit::schedule()
{
        // NOOP
        return 1;
}
/*
-----------------------------------------------------------------------
---------------*/
int
AlmLogMsgkit::cancel()
{
        // NOOP
        return 1;
}
/*
-----------------------------------------------------------------------
---------------*/
int
AlmLogMsgkit::status()
{
        return _active;
}

/*
-----------------------------------------------------------------------
---------------*/
void
AlmLogMsgkit::set_log_file()
{
        // get the full path to the file name
        char *tmp;
        _logFile = (tmp = getenv("WACS_HOME")) != 0 ? tmp : "/src/work/WACS";
        _logFile += "/OAM/logs/wcp_alarm.log";
}
/*
-----------------------------------------------------------------------
---------------*/
const char *
AlmLogMsgkit::timestamp()
{
        // get the current time
        char timestring[30];
        timeval   cur_time;
        ::gettimeofday (&cur_time, 0);
        ::cftime(timestring, "%D %T", &(cur_time.tv_sec));
```

```
        _timestamp = timestring;

return (_timestamp);
}
- - - - - - - - - - -
X-Sun-Data-Type: default
X-Sun-Data-Description: default
X-Sun-Data-Name: Alarm.C
X-Sun-Charset: us-ascii
X-Sun-Content-Lines: 143 include "OTC/debug/logstrm.hh"
include "OTC/debug/tracetag.hh"
#include "OTC/debug/tracer.hh"
#include "alarm/Alarm.h"
#include "alarm/AlmDaemon.h"
#include "alarm/AlmMsgKit.h"
#include "odbms/AlmProfDb.h"
#include "alarm/AlmEntry.h"
#include "odbms/AlmActiveDb.h"
#include "alarm/AlmSvcMsgKit.h"

// global variables
extern TTIPC        *ipc;
extern Dispatcher   *disp;
extern OTC_TraceTag ALARM_TRACE;

// static variables...
AlmSvcMsgKit *Alarm::_almSvcMsgKit = 0;
static const int TRIGGER = 1;
static const int CLEAR   = 0;

/*
-----------------------------------------------------------------
----------------*/
//  ******************** Alarm  Transaction  **************
/*
-----------------------------------------------------------------
----------------*/
Alarm::Alarm()
    : _almEntry(0), _almProfDb(0), _almActiveDb(0), _guiMsgKit(0)
{
    for ( int i = 0; i < NUM_ALARM_KITS; i++ )
        _almMsgKit[i] = 0;
}
/*
```

```
/* ------------------------------------------------------------
   -------------- */
Alarm::~Alarm()
{
        if ( _guiMsgKit )
                delete _guiMsgKit;

for ( int i = 0; i < NUM_ALARM_KITS; i++ )
                if ( _almMsgKit[i] )
                        delete _almMsgKit[i];

// if the alarm service object exists transfer alarm data
        if ( _almSvcMsgKit )
                _almSvcMsgKit->send(CLEAR, id());
}
/* ------------------------------------------------------------
   -------------- */
int
Alarm::init(AlmDaemon *almd, SPString &aname, SPString &aid, AlmProfDb *aProfDb,
AlmActiveDb *aActiveDb)
{
        // get a handle to the profile data base
        _almProfDb   = aProfDb;
        _almActiveDb = aActiveDb;

// get the entry for this alarm
        if ( !_almProfDb->find(aname, _almEntry) )
                return 0;

// set id for this alarm
        _almId = aid;

// alarm daemon in client mode so init server connection
        if ( almd->alarm_client() && !_almSvcMsgKit ) {
                _almSvcMsgKit = new AlmSvcMsgKit;
                _almSvcMsgKit->init(almd);
        }

// create all the message kits
        _guiMsgKit    = new GuiMsgkit;
        _almMsgKit[0] = new AudioMsgkit;
        _almMsgKit[1] = new AlmPrinterMsgkit;
        _almMsgKit[2] = new AlmMailMsgkit;
        _almMsgKit[3] = new AlmLogMsgkit;
```

```cpp
        // initialize the message kits
        _guiMsgKit->init(this, _almEntry);
        for ( int i = 0; i < NUM_ALARM_KITS; i++ )
                if ( _almMsgKit[i] )
                        _almMsgKit[i]->init(this, _almEntry);

return 1;
}
/*
------------------------------------------------------------------------
----------------*/
int
Alarm::trigger(int arg)
{
        // if the alarm service object exists transfer alarm data
        if ( _almSvcMsgKit && !arg )
                _almSvcMsgKit->send(TRIGGER, id(), name(), supplement());

// process each alarm accordingly
        for ( int i = 0; i < NUM_ALARM_KITS; i++ ) {
                if ( _almMsgKit[i] && _almMsgKit[i]->status() ) {
                        _almMsgKit[i]->execute(arg);
                        _almMsgKit[i]->schedule();
                }
        } return 1;
}
/*
------------------------------------------------------------------------
----------------*/
int
Alarm::acknowledge()
{
        // tell the gui to clear the alarm
        _guiMsgKit->cancel();

// process e    ach alarm accordingly
        for ( int i = 0; i < NUM_ALARM_KITS; i++ ) {
                if ( _almMsgKit[i] && _almMsgKit[i]->status() )
                        _almMsgKit[i]->cancel();
        } return 1;
}
```

```
/*
-----------------------------------------------------------------
----------------*/
void
Alarm::display()
{
        _guiMsgKit->execute();
}
/*
-----------------------------------------------------------------
----------------*/
int
Alarm::level()
{
        return   _almEntry->level();
}
/*
-----------------------------------------------------------------
----------------*/
void
Alarm::store()
{
        // store the data in the active alarm
        // database
        _almActiveDb->add(_almId, this);
}
/*
-----------------------------------------------------------------
----------------*/
void
Alarm::remove()
{
        // remove the data from the active alarm
        // database
        _almActiveDb->remove(_almId);
}
```

While a specific embodiment of the invention has been shown and described, it is to be understood that numerous changes and modifications may be made therein without departing from the scope, spirit and intent of the invention as set forth in the appended claims.

What I claim is:

1. A wireless telephone system, comprising:

a plurality of cell-sites, each cell-site having a base-station and a number of mobile-subscribers linked to said base station;

a central adjunct node-processor linking together said plurality of cell-sites, and controlling all call-processing functions and operations between said plurality of cell-sites;

said adjunct node-processor comprising a computer having memory means for storage of data; said memory means comprising control means for controlling call-processing of a telephone call between mobile subscribers;

said memory means comprising objects-oriented software comprising a state table defining all of the possible states for call-connection to a said cell-site, and objects-directed software means for creating pointers for said state stable;

said plurality of cell-sites comprising at least two different cell-sites operating on different specifications and protocol, said objects-oriented software linking together said at least two different cell-sites, whereby cell-sites of different specifications and protocols may be linked together by said central adjunct node-processor;

whereby different cell-sites operating on different specifications and protocol may be subsequently coupled to said central adjunct node-processor via said memory means using the existing hardware elements, so that existing hardware elements need not be replicated in order to accommodate different cell-sites operating on different specifications and protocol.

2. The wireless telephone system according to claim 1, in combination with a public switched telephone network, and further comprising:

matrix-switch means operatively associated with said central adjunct node-processor for coupling each of said plurality of cell-sites to said public switched telephone network;

said matrix-switch means being controlled by said adjunct node-processor;

said control means of said memory means of said adjunct node-processor switch also comprising means for controlling the operation and functioning of said matrix-switch means for call-processing of a telephone call between a mobile-subscriber and said public switched telephone network.

3. The wireless telephone system according to claim 2, wherein said control means comprises a first call-processing objects-software, a second cell-site interface objects-software, and a third switch-interface objects-software; said first call-processing objects-software controlling call-processing states for control of said second and third objects-software; said second objects-software interfacing said adjunct node-processor and said first call-processing objects-software with said cell-sites; and said third objects-software interfacing said adjunct node-processor and said first call-processing objects-software thereof to said matrix switch means.

4. The wireless telephone system according to claim 3, wherein said first call-processing objects-software comprises a first state table defining all of the possible individual states for call-processing and the actions associated therewith, and first objects-directed software means for creating pointers for said state stable for recording the state of a call of a said mobile-subscriber and for creating all call-process handling by means of said state table.

5. The wireless telephone system according to claim 4, wherein said second objects-software also comprises a second state table defining all of the possible states for call-connection to a said mobile-subscriber of a said cell-site, and second objects-directed software means for creating pointers for said second state stable.

6. The wireless telephone system according to claim 5, wherein said third objects-software also comprises a third state table defining all of the possible states for call-connection between a said cell-site and the PSTN, and third objects-directed software means for creating pointers for said third state stable.

7. The wireless telephone system according to claim 2, further comprising at least one additional central adjunct node-processor linking together at least another set of a plurality of cell-sites for forming a node-network, said at least one additional central adjunct node-processor controlling all call-processing functions and operations between said at least another set of a plurality of cell-sites and the public switched telephone network; and at least one additional matrix-switch means operatively associated with said at least one additional central adjunct node-processor for coupling each said cell-site of said at least another set of plurality of cell-sites to the public switched telephone network;

said at least one additional matrix-switch means being controlled by said at least one additional adjunct node-processor;

said at least one additional adjunct node-processor also comprising a computer having memory means for storage of data; said memory means of said at least one additional adjunct node-processor comprising control means for controlling the operation and functioning of said at least one additional matrix switch, and for controlling call-processing of a telephone call between a said mobile-subscriber of said at least another set of a plurality of cell-sites and the public switched telephone network;

said memory means of each of said central adjunct node-processor and said at least one additional central adjunct node-processor comprising linkage means for linking said central adjunct node-processors together for two-way communication and control.

8. The wireless telephone system according to claim 7, wherein said control means of each said central adjunct node-processor comprises means for directing a call associated with a said mobile-subscriber thereof to the other central adjunct node-processor, so that when a call is made from a said mobile-subscriber of one said central adjunct node-processor to a mobile-subscriber of the other said central adjunct node-processor, the PSTN is avoided.

9. The wireless telephone system according to claim 7, wherein said control means further comprises means for handing off control of all call-processing functions and operations associated therewith to another said central adjunct node-processor, whereby, when one said central adjunct node-processor is experiencing down-time, another said central adjunct node-processor may assume the tasks thereof.

10. The wireless telephone system according to claim 7, wherein said memory means of each said central adjunct node-processor further comprises alarm-management means for receiving and reporting an alarm condition associated said wireless telephone system; said means for handing off control of all call-processing functions and operations comprising means for handing off alarm-management functions and operations associated therewith to another said central adjunct node-processor, whereby when one central adjunct node-processor's alarm-management system fails, its functions are taken over by another central adjunct node-processor in the network.

11. The wireless telephone system according to claim 1, wherein said objects-oriented software links together at least two of: a first AMPS-type cell-site; a second GSM-type cell-site, a third TACS-type cell-site, and a fourth NMT-type cell-site.

12. The wireless telephone system according to claim 1, wherein said memory means further comprises billing means for initiating the start of the billing time-period for a call associated with a said mobile-subscriber, and terminating the billing time-period upon termination of the call; said billing means relatively-instantaneously recording and tracking the billing of each said mobile-subscriber, whereby limits and constraints imposed on any said mobile-subscriber may be enforced.

13. The wireless telephone system according to claim 1, wherein said memory means further comprises alarm-management means for receiving and reporting an alarm condition associated said wireless telephone system.

14. A wireless telephone system, for alternate connection to a public switched telephone network, comprising:

a plurality of central adjunct node-processors linked together to form a network, each said central adjunct node-processor linking together a plurality of cell-sites, and controlling all call-processing functions and operations between said plurality of cell-sites and the public switched telephone network;

each said cell-site having a base-station and a number of mobile-subscribers linked to said base station;

a plurality of matrix-switch means, one said matrix switch means operatively associated with one said central adjunct node-processor of said plurality of central adjunct node-processors, for coupling each said plurality of cell-sites to the public switched telephone network;

each said matrix-switch means being controlled by a said adjunct node-processor;

each said adjunct node-processor comprising substantially identical computer means having memory means for storage of data; said memory means comprising control means for controlling the operation and functioning of a said matrix-switch means, and for controlling call-processing of a telephone call between a mobile-subscriber and the public switched telephone network;

each said memory means of each said central adjunct node-processor further comprising hand-off means, whereby each said central adjunct node-processor is capable of assuming the control and functions performed by any other said central adjunct node-processor of said network, whereby, during the down-time of one said central adjunct node-processor, its control and functions are taken over by another said central adjunct node-processor of said network;

whereby different cell-sites operating on different specifications and protocol may be subsequently coupled to said central adjunct node-processor via said memory means using the existing hardware elements, so that existing hardware elements need not be replicated in order to accommodate different cell-sites operating on different specifications and protocol.

15. The wireless telephone system according to claim 14, wherein said control means for controlling the operation and functioning of a said matrix-switch means, and for controlling call-processing of a telephone call between a said mobile-subscriber and the public switched telephone network is capable of controlling each of said plurality of matrix-switch means of said network.

16. The wireless telephone system according to claim 14, wherein said memory means of each said central adjunct node-processor further comprises alarm-management means for receiving and reporting an alarm condition associated said wireless telephone system; said hand-off means for handing off control of all call-processing functions and operations comprising means for handing off alarm-management functions and operations associated therewith to another said central adjunct node-processor, whereby when one central adjunct node-processor's alarm-management system fails, its functions are taken over by another central adjunct node-processor in the network.

17. The wireless telephone system according to claim 14, wherein said memory means further comprises billing means for initiating the start of the billing time-period for a call associated with a said mobile-subscriber thereof, and terminating the billing time-period upon termination of the call; said billing means relatively-instantaneously recording and tracking the billing of each said mobile-subscriber, whereby limits and constraints imposed on any said mobile-subscriber may be enforced.

18. The wireless telephone system according to claim 17, wherein said hand-off means for handing off control of all call-processing functions and operations comprises means for handing off alarm-management functions and operations associated therewith to another said central adjunct node-processor, whereby when one central adjunct node-processor's alarm-management system fails, its functions are taken over by another central adjunct node-processor in the network.

19. A central adjunct node-processor for a wireless telephone system, for linking together a plurality of cell-sites where each cell-site comprises a base station and mobile-subscribers, comprising:

a personal computer having memory means for storage of data; said memory means comprising control means for controlling the operation and functioning of the plurality of cell-sites, and for controlling call-processing of a telephone call between mobile-subscribers;

said control means comprising call-processing objects-software;

said call-processing objects-software comprising a state table defining all of the possible individual states for call-processing and the actions associated therewith, and objects-directed software means for creating pointers for said state stable for recording the state of a call of a mobile-subscriber and for creating all call-process handling by means of said state table;

said control means further comprising cell-site interface objects-software, said call-processing objects-software controlling call-processing states for control of said cell-site interface objects-software; said cell-site interface objects-software interfacing said adjunct node-processor and said call-processing objects-software with its cell-sites;

said cell-site interface objects-software also comprising a state table defining all of the possible states for call-connection to a mobile-subscriber of a cell-site, and objects-directed software means for creating pointers for said state table thereof;

a plurality of cell-sites linked to said central adjunct node-processor by said cell-site interface objects-software; said plurality of cell-sites comprising at least two cell-sites operating on different specifications and protocol, whereby said cell-site interface objects-software adapts to each for control by said adjunct node-processor;

whereby different cell-sites operating on different specifications and protocol may be subsequently coupled to said central adjunct node-processor via said memory means using the existing hardware elements, so that existing hardware elements need not be replicated in order to accommodate different cell-sites operating on different specifications and protocol.

20. The central adjunct node-processor for a wireless telephone system, for linking together a plurality of cell-sites, according to claim 19, wherein said plurality of cell-sites comprises at least two from the group of: GSM-type system; AMPS-type system; NTM-type system; and TACS-type system.

21. In an adjunct processor for a wireless telephone system, which adjunct processor comprises memory means, said memory means comprising linking means for linking the adjunct processor to a plurality of cell-sites forming part of the wireless telephone system, the improvement comprising:

said linking means comprising cell-site interface objects-oriented software for directly linking cell-sites operating with different specifications and protocol to the adjunct-processor for control thereby;

said cell-site interface objects-oriented software comprising a state table defining all of the possible states for call-connection to any of the cell-sites linked thereto, and objects-directed software means for creating pointers for said state table thereof;

whereby different cell-sites operating on different specifications and protocol may be subsequently coupled to said adjunct processor via said memory means using the existing hardware elements, so that existing hardware elements need not be replicated in order to accommodate different cell-sites operating on different specifications and protocol.

22. The adjunct processor for a wireless telephone system according to claim 21, wherein said cell-site interface objects-oriented software comprises a state table defining all of the possible states for call-connection to any of the cell-sites linked there to, and objects-directed software means for creating pointers for said state table thereof.

23. The adjunct processor for a wireless telephone system according to claim 22, in combination with a plurality of cell-sites, at least two of said plurality of cell-sites being from the group of: GSM-type system; AMPS-type system; NTM-type system; and TACS-type system.

24. The adjunct processor for a wireless telephone system according to claim 22, wherein said memory means further comprises call-processing objects-software for controlling said cell-site interface objects-oriented software, and also comprising a state table defining all of the possible individual states for call-processing and the actions associated therewith, and objects-directed software means for creating pointers for said state stable for recording the state of a call of a mobile-subscriber and for creating all call-process handling by means of said state table.

25. The adjunct processor for a wireless telephone system according to claim 24, in combination with at least one more adjunct processor for forming a wireless telephone network, said at least one more adjunct processor also comprising memory means having linking means for linking said at least one more adjunct processor to another plurality of cell-sites forming part of the wireless telephone system, said linking means of said at least one more adjunct processor also comprising cell-site interface objects-oriented software, whereby said another plurality of cell-sites operating with different specifications and protocol may be readily linked to said at least one more adjunct-processor for control thereby;

said cell-site interface objects-oriented software of said adjunct processor and said cell-site interface objects-oriented software of said at least one more adjunct processor being substantially the same, whereby, if one said adjunct processor fails or is experiencing downtime, another said adjunct processor may take over all of the control, functions and operations thereof.

26. The adjunct processor for a wireless telephone system according to claim 21, wherein said adjunct processor is a personal computer.

27. The adjunct processor for a wireless telephone system according to claim 25, wherein each said adjunct processor is a personal computer.

28. The adjunct processor for a wireless telephone system according to claim 26, wherein said memory means further comprises billing means for initiating the start of the billing time-period for a call associated with a mobile-subscriber thereof, and terminating the billing time-period upon termination of the call; said billing means relatively instantaneously recording and tracking the billing of each said mobile-subscriber, whereby limits and constraints imposed on any said mobile-subscriber may be enforced.

29. The adjunct processor for a wireless telephone system according to claim 26, wherein said memory means of each said adjunct processor further comprises alarm-management means for receiving and reporting an alarm condition associated with said wireless telephone system; and hand-off means for handing off control of all call-processing functions and operations and all alarm-management functions and operations to another said adjunct processor, whereby when one adjunct processor's alarm-management system fails, its functions are taken over by another adjunct processor in the network.

30. In an adjunct processor for a wireless telephone system, which adjunct processor comprises memory means, said memory means comprising linking means for linking the adjunct processor to a plurality of cell-sites forming part of the wireless telephone system, the improvement comprising:

said linking means comprising cell-site interface objects-oriented software, whereby cell-sites operating with different specifications and protocol may be readily linked to the adjunct-processor for control thereby;

said memory means further comprising call-processing objects-software for controlling said cell-site interface objects-oriented software, and also comprising a state table defining all of the possible individual states for call-processing and the actions associated therewith, and objects-directed software means for creating pointers for said state stable for recording the state of a call of a mobile-subscriber and for creating all call-process handling by means of said state table;

and further comprising at least one more adjunct processor for forming a wireless telephone network, said at least one more adjunct processor also comprising memory means having linking means for linking said at least one more adjunct processor to another plurality of cell-sites forming part of the wireless telephone system, said linking means of said at least one more adjunct processor also comprising cell-site interface objects-oriented software, whereby said another plurality of cell-sites operating with different specifications and protocol may be readily linked to said at least one more adjunct-processor for control thereby; said cell-site interface objects-oriented software of said adjunct processor and said cell-site interface objects-oriented software of said at least one more adjunct processor being substantially the same, whereby, if one said adjunct processor fails or is experiencing down-time, another said adjunct processor may take over all of the control, functions and operations thereof.

31. A wireless telephone system, such as a cellular system and a personal communications system, comprising:

a plurality of cell-sites, each cell-site having a base-station and a number of mobile-subscribers linked to said base station;

a central adjunct node-processor linking together said plurality of cell-sites, and controlling all call-processing functions and operations between said plurality of cell-sites;

said adjunct node-processor comprising a computer having memory means for storage of data; said memory means comprising control means for controlling call-processing of a telephone call between mobile subscribers;

at least one additional central adjunct node processor linking together at least another set of a plurality of cell-sites for forming a node-network, said at least one additional central adjunct node-processor controlling all call-processing functions and operations of said at least another set of a plurality of cell-sites;

said at least one additional adjunct node-processor also comprising a computer having memory means for storage of data; said memory means of said at least one additional adjunct node-processor comprising control means for controlling the operation and functioning of call-processing of a telephone call between mobile-subscribers of said at least another set of a plurality of cell-sites;

said memory means of each of said central adjunct node-processor and said at least one additional central adjunct node-processor comprising linkage means for linking said central adjunct node-processors together for two-way communication and control.

32. The wireless telephone system according to claim 31, wherein said control means of each said central adjunct node-processor comprises means for directing a call associated with a mobile-subscriber thereof to the other central adjunct node-processor, so that when a call is made from a mobile-subscriber of one said central adjunct node-processor to a mobile-subscriber of the other said central adjunct node-processor, the public switched network is avoided.

33. A wireless telephone system, such as a cellular system, and a personal communications system, comprising:

a plurality of cell-sites, each cell-site having a base-station and a number of mobile-subscribers linked to said base station;

a central adjunct node-processor linking together said plurality of cell-sites, and controlling all call-processing functions and operations between said plurality of cell-sites;

matrix-switch means operatively associated with said central adjunct node-processor for coupling each of said plurality of cell-sites to the public switched telephone network;

said matrix-switch means being controlled by said adjunct node-processor;

said adjunct node-processor comprising a computer having memory means for storage of data; said memory means comprising control means for controlling the operation and functioning of said matrix switch, and for controlling call-processing of a telephone call between a said mobile-subscriber and the public switched telephone network;

said memory means comprising objects-oriented software comprising a state table defining all of the possible states for call-connection to a said cell-site, and objects-directed software means for creating pointers for said state stable for controlling said matrix-switch means;

said memory means further comprising billing means interacting with said state table and said matrix-switch means for initiating the start of the billing time-period for a call associated with a said mobile-subscriber, and terminating the billing time-period upon termination of the call; said billing means relatively-instantaneously recording and tracking the billing of each said mobile-subscriber via said matrix-switch means, whereby limits and constraints imposed on any said mobile-subscriber may be enforced.

* * * * *